(12) United States Patent
Murai et al.

(10) Patent No.: US 7,182,877 B2
(45) Date of Patent: Feb. 27, 2007

(54) METHOD FOR MANUFACTURING ELECTRO-OPTICAL DEVICE, ELECTRO-OPTICAL DEVICE, AND ELECTRONIC APPARATUS

(75) Inventors: Hidetoshi Murai, Matsumoto (JP); Manabu Hanakawa, Nagano-ken (JP)

(73) Assignee: Seiko Epson Corporation (JP)

( * ) Notice: Subject to any disclaimer, the term of this patent is extended or adjusted under 35 U.S.C. 154(b) by 193 days.

(21) Appl. No.: 10/732,198

(22) Filed: Dec. 10, 2003

(65) Prior Publication Data

US 2004/0182817 A1    Sep. 23, 2004

(30) Foreign Application Priority Data

Dec. 10, 2002  (JP)  ............... 2002-358377
Dec. 10, 2002  (JP)  ............... 2002-358378

(51) Int. Cl.
*B29D 11/00*  (2006.01)

(52) U.S. Cl. ............... 216/24; 216/23; 216/25; 216/26

(58) Field of Classification Search ............... 216/23, 216/25, 26, 24
See application file for complete search history.

(56) References Cited

U.S. PATENT DOCUMENTS

| 5,770,305 | A * | 6/1998 | Terasaka ............... 428/328 |
| 5,909,264 | A | 6/1999 | Fujikawa et al. |
| 6,613,148 | B1 * | 9/2003 | Rasmussen ............... 118/401 |
| 6,613,606 | B1 * | 9/2003 | Lee ............... 438/108 |
| 6,667,222 | B1 * | 12/2003 | Su et al. ............... 438/424 |
| 2002/0167634 | A1 * | 11/2002 | Watanable et al. ............... 349/153 |
| 2003/0057183 | A1 * | 3/2003 | Cho et al. ............... 216/23 |
| 2003/0132523 | A1 * | 7/2003 | Ohtani et al. ............... 257/758 |
| 2003/0146491 | A1 * | 8/2003 | Tsuura ............... 257/530 |

FOREIGN PATENT DOCUMENTS

| GB | 2312073 | 10/1997 |
| JP | 06-206740 | 7/1994 |
| JP | 08-262419 | 10/1996 |
| JP | 08-328485 | 12/1996 |

(Continued)

OTHER PUBLICATIONS

Communication from Japanese Patent Office re: counterpart application, no date.

(Continued)

*Primary Examiner*—Napine Norton
*Assistant Examiner*—Patricia A. George
(74) *Attorney, Agent, or Firm*—Harness, Dickey & Pierce, P.L.C.

(57) ABSTRACT

A method is provided for manufacturing an electro-optical device, in which fine scratches or cracks can be removed by etching without damaging wiring, an electro-optical device, and an electronic apparatus. According to the method, a liquid crystal panel used in an electro-optical device is cut as a single product. Then, before an IC mounting step, in a state of the single product liquid crystal panel, a wet etching is performed on the cut faces and edges of the first and second substrates to remove fine scratches or cracks from the cut faces and edges of the substrates. At this time, wiring portions, IC mounting terminals, substrate mounting terminals, and alignment marks, which are formed on the protruding region, are covered with a protection layer.

23 Claims, 26 Drawing Sheets

FOREIGN PATENT DOCUMENTS

| | | |
|---|---|---|
| JP | 10-010505 | 1/1998 |
| JP | 10-133186 | 5/1998 |
| JP | 10-206898 | 8/1998 |
| JP | 10-231144 | 9/1998 |
| JP | 2000-172189 | 6/2000 |
| JP | 2000-321591 | 11/2000 |
| JP | 2001-075117 | 3/2001 |
| JP | 2001-091918 | 4/2001 |
| JP | 2001-125508 | 5/2001 |
| JP | 2001320196 A * | 11/2001 |
| JP | 2002-049026 | 2/2002 |
| JP | 2002-196361 | 7/2002 |
| JP | 2002-318547 | 10/2002 |
| JP | 2003-084265 | 3/2003 |
| KR | 10-0202231 | 3/1999 |

OTHER PUBLICATIONS

Communication from Chinese Patent Office re: related application, no date.

Communication from Korean Patent Office regarding related application, no date.

* cited by examiner

ST11~ST16

ST21~ST24

ST31

ST32~ST33

ST34

ST35

FIG. 10A  <NO ETCHING>
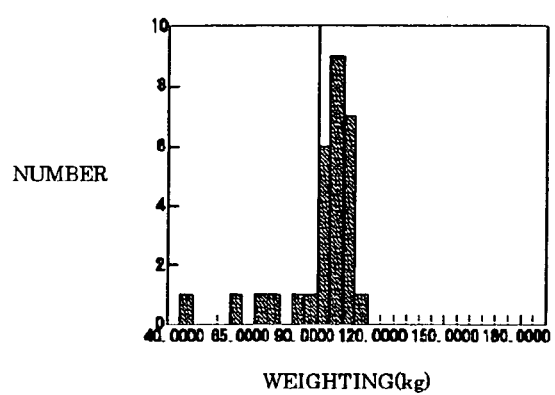
FIG. 10B  <ETCHING DEPTH:10μm>
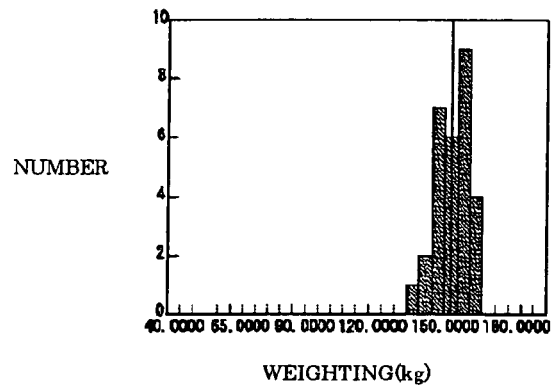
FIG. 10C  <ETCHING DEPTH:50μm>
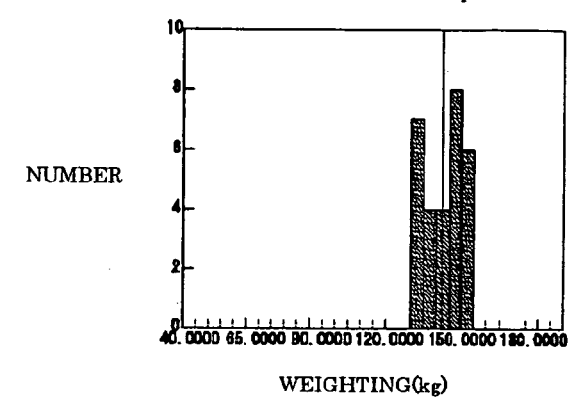
FIG. 10D  <ETCHING DEPTH:100μm>
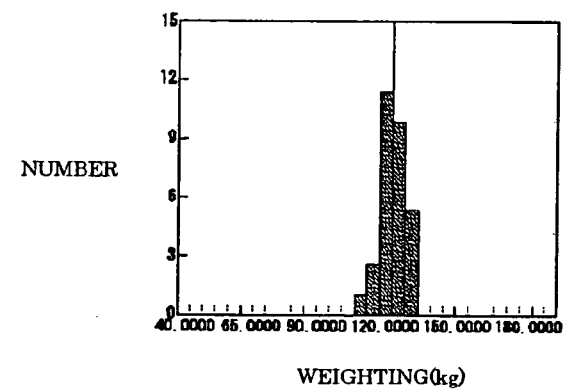

F I G. 2 3
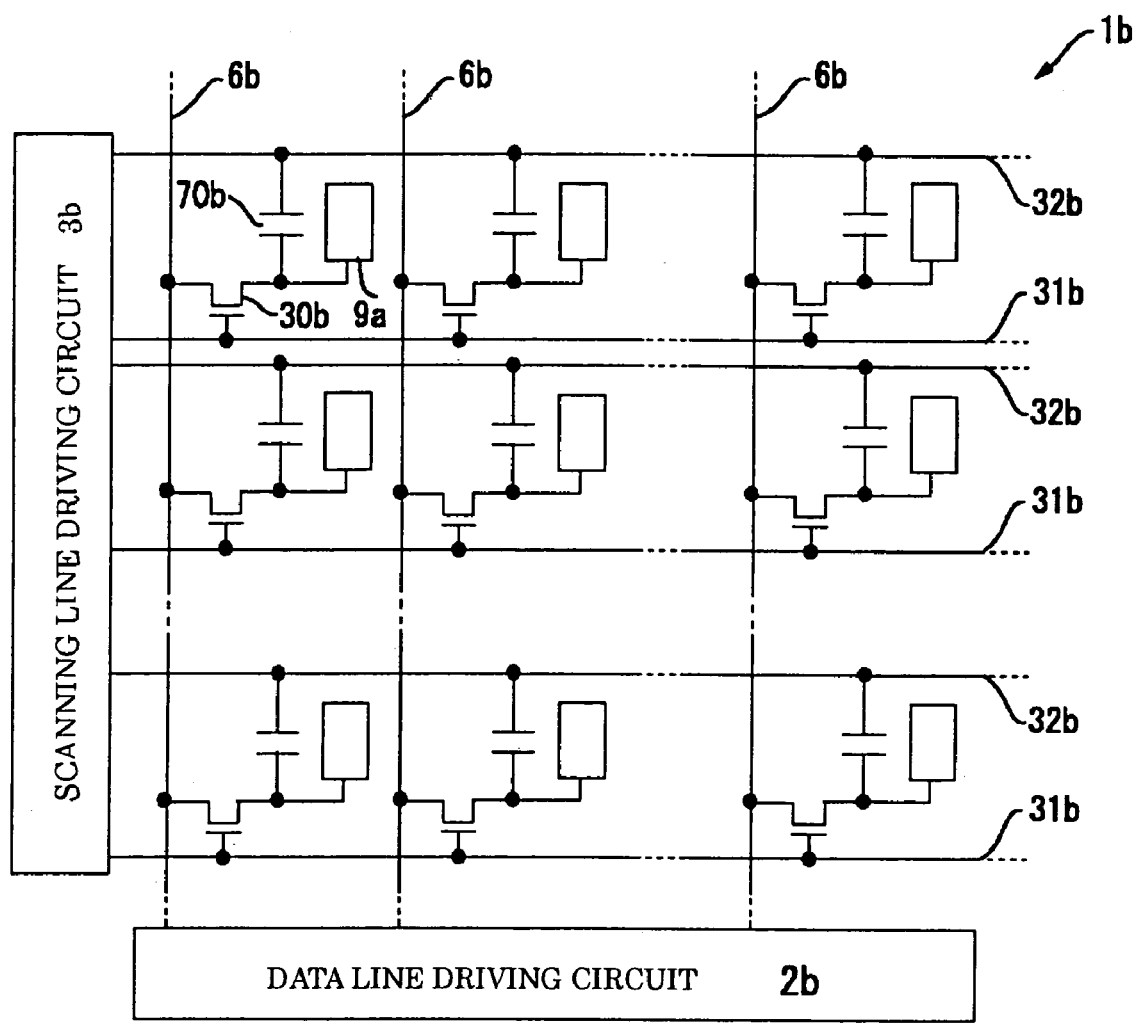

METHOD FOR MANUFACTURING ELECTRO-OPTICAL DEVICE, ELECTRO-OPTICAL DEVICE, AND ELECTRONIC APPARATUS

BACKGROUND OF THE INVENTION

1. Technical Field of the Invention

The present invention generally relates to a method for manufacturing an electro-optical device including an electro-optical panel having a pair of substrates, which have a predetermined size and are bonded to be opposite to each other, an electro-optical device manufactured by the method, and an electronic apparatus using the electro-optical device. More specifically, the present invention relates to a process for preventing the substrates from being cracked in the state of an electro-optical panel.

2. Description of the Related Art

Electro-optical devices, such as liquid crystal devices, LED (Light-Emitting Diode) display devices including organic electro-luminescence display devices, plasma display devices, FED (Field Emission display) devices, electrophoresis display devices, and DMDs (Digital Micromirror Devices), have a panel structure in which a pair of glass substrates, on which driving electrodes for driving an electro-optical material are formed, are bonded to each other by a sealing material or a panel structure in which protective glass substrates are bonded to a pair of glass substrates, on which electrodes for driving an electro-optical material are formed, by a sealing material. In the electro-optical devices having any one of the panel structures, substrates, which are cut out in a predetermined size from a large substrate, are used rather than single-sized substrates.

For example, in the liquid crystal device, electrode patterns are formed on a large substrate having a plurality of single-sized liquid crystal panels. After a plurality of large substrates are bonded to each other, the bonded substrate is cut into a predetermined size, thereby forming a single product liquid crystal panel.

In the liquid crystal panel, since it is necessary to provide liquid crystal-driving signals to driving electrodes, one of a pair of the substrates protrudes from an edge of the other. Substrate mounting terminals, to which a plastic substrate is connected, IC mounting terminals, on which an IC is mounted, and wiring lines for providing output signals from the IC to electrode patterns are formed on the protrusion region.

Substrates included in the liquid crystal panel are cut out into a predetermined size by a method, in which cut lines are drawn on a large substrate by a diamond cutter and then pushed and divided by the jig applying force from the rear side of the substrate, or by a method, in which cut lines are drawn on a large substrate, and then a laser is irradiated on the cut lines to divide the large substrate. However, in any one of the cutting methods, small scratches or cracks are made on the edge or the cut faces of the substrate by stress in the process of cutting the substrate, and those scratches or cracks are grown by additional stress. As a result, if a liquid crystal device is used in a mobile phone, a liquid crystal panel is broken by an impact when the mobile phone is dropped.

Therefore, the inventors propose that an etching step is performed on the edge or the cut face of the cut substrate to remove fine scratches or cracks.

However, since strong acid such as hydrofluoric acid is used to etch the glass substrate and wiring lines composed of an ITO film or a metal film are formed on the glass substrate, the wiring lines may be damaged by etching solution when fine scratches or cracks, which are made in the edge or the cut face of the glass substrate, are removed by etching.

Accordingly, it is an object of the present invention to solve the problems and to provide a method for manufacturing an electro-optical device capable of removing fine scratches or cracks on the edge or cut face of a substrate using an etching step without damaging wiring lines formed on the substrate, an electro-optical device manufactured by the method, and an electronic apparatus using the electro-optical device.

SUMMARY

In order to solve the above-described problem, a method is provided for manufacturing an electro-optical device, the method comprising a step of etching at least edges and cut faces of a first substrate and a second substrate in a state of the electro-optical panel in which the first substrate is bonded to the second substrate, which is opposite to the first substrate, by a sealing material provided therebetween to remove fine scratches from the first substrate and the second substrate, wherein at least a portion of the wiring lines exposed from the first substrate and the second substrate is covered with a protection layer formed to avoid at least the edges and cut faces of the first substrate and the second substrate.

In an embodiment of the present invention, the etching step is performed on the exposed entire surfaces, edges, and cut faces (side end faces) of the substrates even in a state where the protection film is formed. Thus, the outer surfaces of the etched portions are etched thinly to remove fine scratches or cracks. As a result, the electro-optical panel does not crack since cracks do not grow even if stress is applied to the electro-optical panel. In addition, when etching is performed, wiring lines covered with the protection layer are not etched, and thus a defect such as erosion does not occur. Furthermore, since the etching step is performed at the final stage of the manufacturing process, that is, in the state of the electro-optical panel where the substrates are bonded to each other, all scratches or cracks generated on the electro-optical panel by that time can be removed collectively.

In the present invention, at least one of the first substrate and the second substrate is made of glass.

In the present invention, preferably, the etching is a wet etching rather than a dry etching. Since the wet etching is isotropically performed, it is proper to remove scratches or cracks. In addition, a large quantity of electro-optical panels can be collectively processed by the wet etching.

In the present invention, the second substrate comprises a protruding region protruding from an edge of the first substrate, and the protection layer covers the wiring lines formed on the protruding region.

Preferably, when electronic component mounting terminals, on which an electronic component is mounted, are formed on the protruding region, the etching may be performed before the electronic component is mounted on the electronic component mounting terminals. When the etching step is performed after the electronic component is mounted, the electronic component can be damaged by an etching solution or etching gas. Therefore, the etching step is preferably performed before the electronic component is mounted.

In the present invention, substrate mounting terminals, on which a plastic substrate is mounted, are formed on the protruding region, and the electronic component mounting terminals are IC mounting terminals to which an IC, serving as an electronic component, is connected. Preferably, the etching step is performed on the IC mounting terminals and the substrate mounting terminals before the IC and the plastic substrate are connected thereto.

In the present invention, when alignment marks, which are used when the electronic component is mounted on the electronic component mounting terminals, are formed on the protruding region, the surfaces of the alignment marks are preferably covered with the protection layer if the etching step is performed.

In the present invention, after the etching step, the protection layer may be removed, or a portion of the protection layer may be removed and the rest of the protection layer may remain. When terminals are formed on the protruding region, a portion of the protection layer formed on the surfaces of the terminals is removed after the etching step. In the present invention, an organic insulating film, which is formed simultaneously with the organic insulating film formed in regions partitioned by the sealing material in the substrates, or an inorganic insulating film, which is formed simultaneously with the inorganic insulating film formed in regions partitioned by the sealing material in the substrates, may be used as the protection layer. If the protection layer is formed of the organic or inorganic insulating film, an additional process for forming a protection layer is not required, thereby reducing the number of manufacturing processes.

In the present invention, an anisotropic conductive film, in which conductive particles are dispersed in thermoplastic resin, can be used as the protection layer. The anisotropic conductive film may be used in mounting the electronic component to the terminals after the etching step. The present invention is characterized in that the wiring lines are formed in a gap between the first substrate and the second substrate at the outer periphery of the sealing material. The wiring lines are not damaged during the etching step because the wiring lines in the gap formed at the outer periphery of the sealing material are also protected by the protection layer. In addition, since the etching step is performed in the final stage of the manufacturing process, that is, in the state of the electro-optical panel where the substrates are bonded to each other, all scratches or cracks generated on the electro-optical panel by that time can be removed collectively. In the present invention, one of the first substrate and the second substrate comprises a protruding region protruding from an edge of the other, and the wiring lines include wiring lines formed on the protruding region. In the present invention, during the etching step, the wiring lines formed on the protruding region are not etched and damaged since the wiring lines are covered with the protection layer.

According to the present invention, the timing to form the protection layer comprises the following four patterns.

In a first pattern, a first protection layer is formed on the protruding region and a second protection layer is formed in the gap in the state of the electro-optical panel where the first substrate is bonded to the second substrate.

In a second pattern, the first protection layer is formed on the protruding region and the second protection layer is formed in the gap before the first substrate is bonded to the second substrate.

In a third pattern, the first protection layer is formed on the protruding region in the state of the electro-optical panel where the first substrate is bonded to the second substrate, and the second protection layer is formed in the gap before the first substrate is bonded to the second substrate.

In a fourth pattern, the first protection layer is formed on the protruding region before the first substrate is bonded to the second substrate, and the second protection layer is formed in the gap in the state of the electro-optical panel where the first substrate is bonded to the second substrate.

In the present invention, IC mounting terminals, on which an IC chip is mounted, are formed on the protruding region. The etching step may be performed before the IC chip is mounted on the IC mounting terminals. In this case, when the etching step is performed, the IC mounting terminals are also covered with the protection layer. At least a portion of the protection layer, which covers the IC mounting terminals, is removed. Furthermore, if the etching step is performed before the IC chip is mounted, the IC chip can be prevented from being damaged by an etching solution or etching gas.

In the present invention, the IC mounting terminals, on which the IC chip is mounted, are formed on the protruding region, and the etching step may be performed after the IC chip is mounted on the IC mounting terminals. According to such construction, it is unnecessary to cover the IC mounting terminals with the protection layer when etching is performed. Herein, the IC chip has only to be covered with the protection layer to prevent damage by an etching solution or etching gas. If the outer surface of a silicon substrate constituting the IC chip is positively etched by an etching solution or etching gas, fine scratches or cracks can be removed from the edge or the cut face of the silicon substrate, thereby preventing the IC chip from being broken.

In the present invention, a tape may be used as all or a portion of the protection layer.

In the present invention, preferably, all or a portion of the protection layer is applied with a liquid material.

In this case, the applying of the liquid material can be performed by a brush coating method, a screen printing method, an inkjet method, or an offset printing method. The step of applying the liquid material can be automatically performed by the screen printing method, the inkjet method, and the offset printing method of these methods. Especially, the liquid material can be applied on the electro-optical panel by the inkjet method without touching the electro-optical panel. As a result, the liquid material can be selectively applied on any region with high precision.

According to the present invention, in the above first and fourth patterns, when the second protection layer is formed on the gap in the state of an electro-optical panel, a liquid material for the protection layer is preferably applied to at least a portion of the opened end of the gap, and the liquid material between the substrates is preferably diffused into the gap by capillary action. According to such construction, it is possible to prevent the erosion of a second wiring, which is located in the gap, thereby minimizing the adhesion of the liquid material on the edge or cut face of the substrate. Furthermore, when the liquid material is applied on at least a portion of the entire opened end of the gap, it is possible to effectively perform the applying step using various methods, thereby improving productivity.

In the present invention, resist or a solution, in which resist is diluted with a solvent, is used as a liquid material. A resist layer (protection layer) may be selectively formed on any position by a photolithography technique.

In the present invention, preferably, the liquid material is paint or an equivalent in which paint is diluted with a solvent.

Also, a water repellent agent for giving water repellency on the applied surface, or an equivalent in which a water repellent agent is diluted with a solvent is preferably used as the liquid material. Since a water-based etching solution is generally used in the wet etching, the wiring can be protected from the etching solution although the surface of the wiring has water repellency using the water repellent agent. In addition, since a very thin film is formed by the process using the water repellent agent, there is no difficulty in mounting the IC or in electrically connecting the plastic substrate even though the protection layer formed on the surfaces of the terminals is not removed. The present invention can be applied to a liquid crystal device, in which liquid crystal is maintained as an electro-optical material between the first substrate and the second substrate, and an electroluminescent display device, in which an electro-luminescent material is formed as the electro-optical material on the second substrate.

This electro-optical device can be used in a display unit of an electronic apparatus such as a portable computer or a mobile phone.

As described above, the etching step is performed on the exposed entire surface, edges, and cut faces (side surfaces) of the substrates even in a state where the protection layer is formed. Thus, the outer surfaces of the etched portions are etched thinly to remove fine scratches or cracks. As a result, the strength of the panel is enhanced. When a wet etching is performed, the wiring covered with the protection layer is not etched, thereby preventing the wiring from being etched and eroded. In addition, since the etching is performed in the final state of the manufacturing process, that is, in a state where the substrates are. bonded to each other, all scratches or cracks generated on the electro-optical panel by that time can be removed collectively.

BRIEF DESCRIPTION OF THE DRAWINGS

FIGS. 10(A) to 10(D) are graphs for explaining etching effect on the liquid crystal panel in the course of the manufacturing process of the electro-optical device illustrated in FIG. 1.

FIG. 23 is a block diagram schematically illustrating the construction of an electro-optical device including an active matrix liquid crystal device in which thin film transistors (TFTs) are used as pixel switching elements.

DETAILED DESCRIPTION

The present invention will be described in detail with reference to the accompanying drawings. A passive matrix liquid crystal device (an electro-optical device), which is an embodiment of the present invention, is mainly described. The construction of a liquid crystal device, which is common to the respective embodiments, a manufacturing method therefore will first be described, and then the respective embodiments will be described.

General Construction of Liquid Crystal Device

Figure 1:
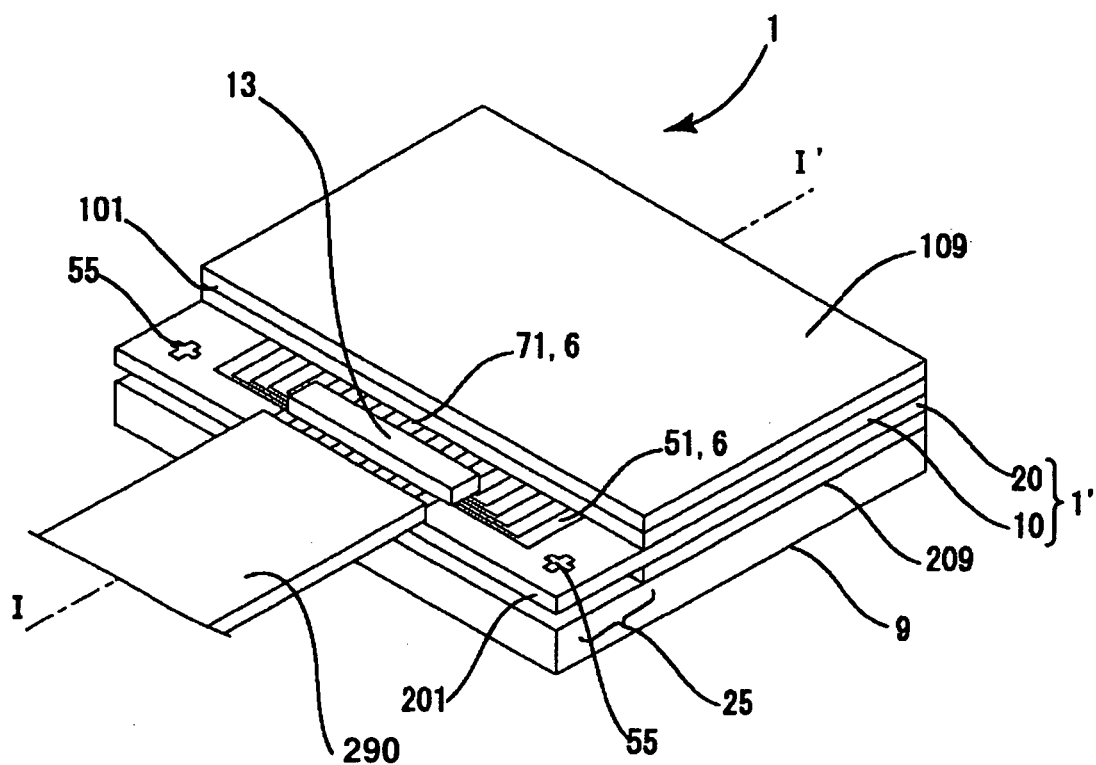
FIG. 1 is a perspective view of an electro-optical device according to the present invention.
Figure 2:
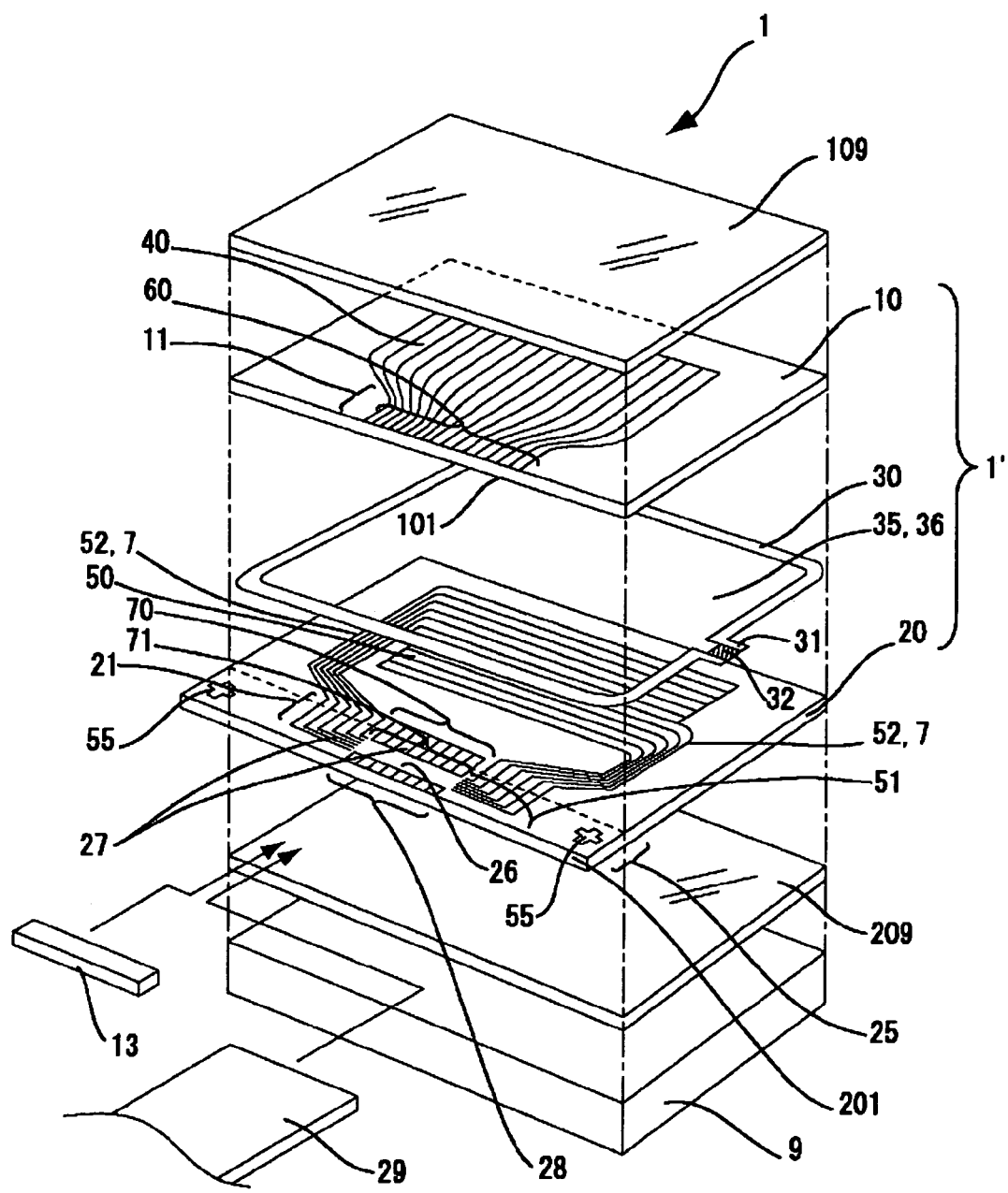
FIG. 2 is an exploded perspective view of the electro-optical device illustrated in FIG. 1.
Figure 3:
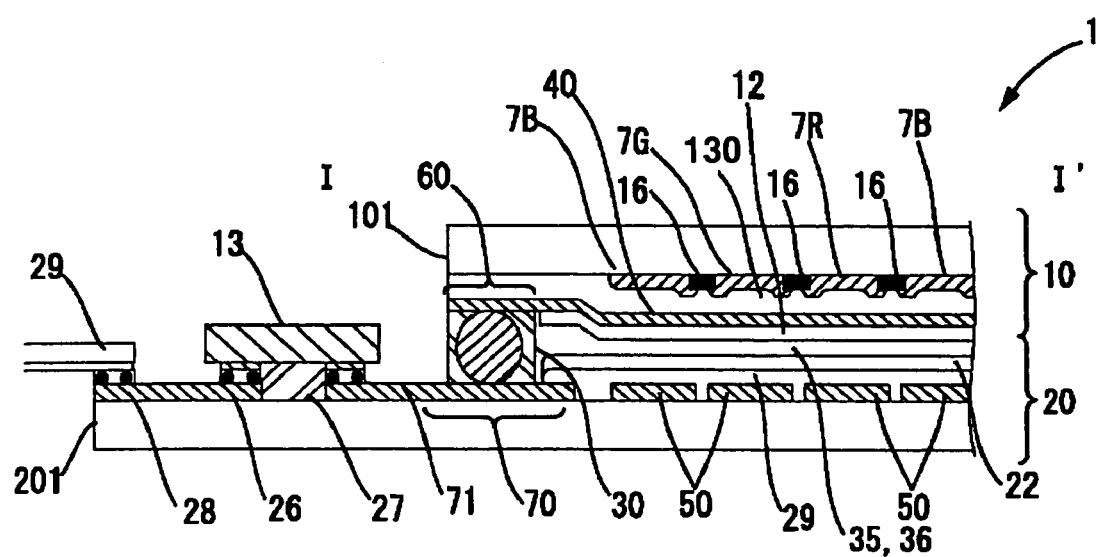
FIG. 3 is a cross-sectional view of the end portion of I' side when the electro-optical device is cut along line I–I' of FIG. 1.
Figure 11A:
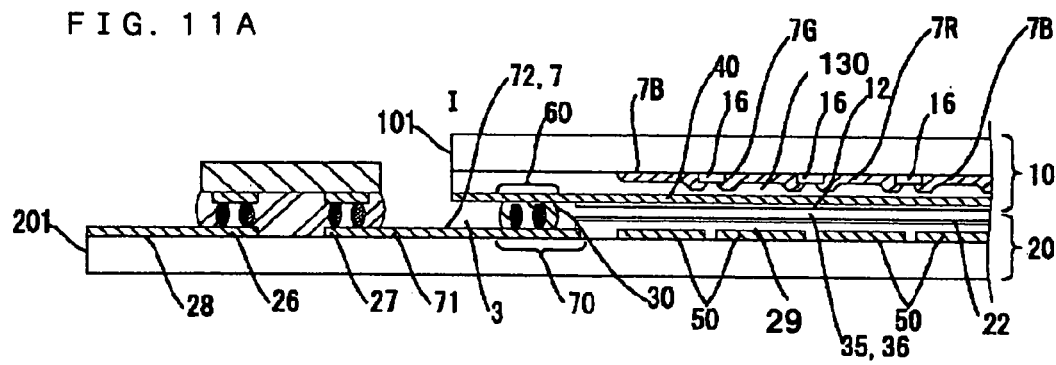
FIGS. 11(A) and (B) is a cross-sectional view of the end portion of I' side when the electro-optical device is cut along the line I–I' of FIG. 1.
Figure 11B:
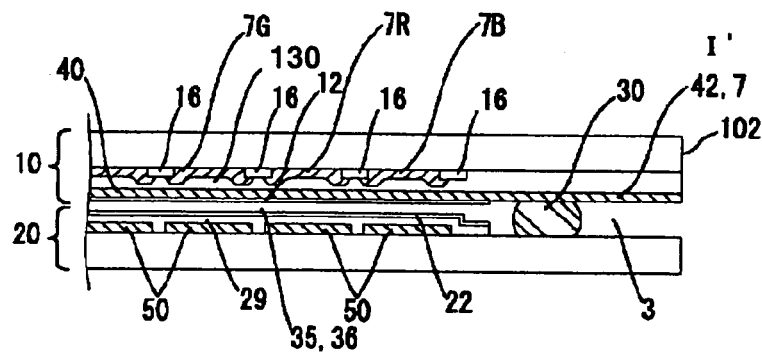

FIGS. 1 and 2 are a perspective view and an exploded perspective view of an electro-optical device according to an embodiment of the present invention, respectively. FIG. 3 is a cross-sectional view shown from the end portion I' when the electro-optical device is cut along the I–I' line of FIG. 1. FIGS. 11(A) and 11(B) respectively show a cross-section and a cross-section shown from the end portions I and I' when the electro-optical device is cut along the I–I' line of FIG. 1. In FIGS. 1 and 2, although electrode patterns or terminals are schematically illustrated, a plurality of electrode patterns or terminals are formed in the actual electro-optical device.

Referring to FIGS. 1 and 2, the electro-optical device 1 according to the present embodiment comprises a passive matrix liquid crystal panel 1' for color display (an electro-optical panel). The liquid crystal panel 1' comprises a pair of glass substrates 10 and 20, which have a rectangular shape and are bonded to each other at a predetermined distance by a sealing material 30. A liquid crystal injection region 35 is partitioned between the substrates 10 and 20 by the sealing material 30, and liquid crystal 36 as an electro-optical material is injected in the liquid crystal injection region 35. Herein, the first substrate 10 comprises a plurality of first electrode patterns 40, which are longitudinally extended in the liquid crystal injection region 35, and the second substrate 20 comprises a plurality of second electrode patterns 50, which are horizontally extended in the liquid crystal injection region 35.

The transmissive electro-optical device 1 comprises an illuminating device 9 as a backlight for performing predetermined display. A polarizer 109 is attached to the outer surface of the first substrate 10, and a polarizer 209 is attached to the outer surface of the second substrate 20 of both surfaces of the liquid crystal panel 1'. Furthermore, the first electrode pattern 40 and the second electrode pattern 50 are both transparent conductive films such as ITO (Indium Tin Oxide) films.

When a patterned thin film such as an aluminum film or a silver-alloy film is formed below the second electrode pattern 50 through an insulating film, a transflective electro-optical device is constituted. In addition, in order to form a transflective electro-optical device, the second electrode pattern 50 may be formed of a reflection film made of aluminum or silver-alloy, and light transmission holes may be formed thereon. Furthermore, it is possible to form a transflective electro-optical device 1 by laminating a transflective film on a deflection plate 62. Moreover, it is possible to form a reflective electro-optical device by arranging a reflective film under the second electrode pattern 50. In this case, the illuminating device 9 is preferably omitted from the rear side of the second substrate 20.

In the electro-optical device 1, when signals are input/output from/to the outside and the electrical conduction between substrates is performed, a first terminal formation region 11 and a second terminal formation region 21, which are respectively formed on the first substrate 10 and the second substrate 20 in the vicinity of the sides 101 and 102 of the respective substrates arranged in the same direction as the first substrate 10 and the second substrate 20, are used.

The second substrate 20 is larger than the first substrate 10. As a result, when the second substrate 20 is attached to the first substrate 10, a protruding region 25 from an edge 101 of the first substrate 10 is formed. A driving IC 13 (an electronic component) is COG-mounted (Chip On Glass) on IC mounting terminals 26 and 27 formed on the protruding region 25, which are electronic component mounting terminals, through an anisotropic conductive film, and a plastic substrate 290 (an electronic component) is mounted on substrate mounting terminals 28 through an anisotropic conductive film. The electronic component mounting terminals are not limited to the IC mounting terminals, but are applicable to any types of mounting terminals for mounting various electronic components.

When such mounting structure is formed, a wiring portion 51 of the second electrode pattern 50 composed of an ITO film is extended to the protruding region 25 on the second substrate 20. The IC mounting terminals 27, to which a bump electrode of the driving IC 13 is electronically connected, are formed in the second terminal formation region 21.

In the second terminal formation region 21, the substrate mounting terminals 28 for mounting the plastic substrate 290 are formed on a portion closer to the side 201 of the substrate than to the IC mounting terminals 27. The patterns composed of an ITO film constituting the substrate mounting terminals 28 are extended to the driving IC 13 mounting region and constitute the IC mounting terminals 26 electronically connected to the bump electrode of the driving IC 13.

Alignment marks 55 composed of ITO films are formed on both sides of the protruding region 25 of the second substrate 20, in which the IC mounting terminals 26 and 27 and the substrate-mounting terminals 28 are formed. The alignment marks 55 used when mounting the driving IC 13 and the plastic substrate 290 are composed of the ITO film.

In the second terminal formation region 21, since a portion closer to the liquid crystal injection region 35 than to the driving IC 13 is used for the electrical conduction with the first substrate 10, a plurality of conduction terminals 70 for the conduction between substrates are formed on an overlapping portion with the first substrate 10. Patterns composed of the ITO film constituting the conduction terminals 70 for the conduction between substrates are also extended to the driving IC 13 mounting region as a wiring portion 71 and constitute the IC mounting terminals 27 electronically connected to the bump electrode of the driving IC 13.

In the first substrate 10, since the first terminal formation region 11 is used for the conduction with the second substrate 20, a plurality of conduction terminals 60 for the conduction between substrates are formed on a portion overlapped with the second substrate 20. The conduction terminals 60 for the conduction between substrates are formed at the end of the first electrode pattern 40 composed of the ITO film.

The first substrate 10 and the second substrate 20 are bonded to each other by a sealing material 30 containing a substrate-conducting material to electrically connect the conduction terminals 60 with the conduction terminals 70 between substrates, and then the driving IC 13 and the plastic substrate 290 are mounted on the second substrate 20. In such a state, if a predetermined signal is input from the plastic substrate 290 into the driving IC 13, the signal output from the driving IC 13 is supplied to the first electrode pattern 40 and the second electrode pattern 50.

As shown in FIG. 3 and FIGS. 11(A) and 11(B), color filters 7R, 7G, and 7B of red (R), green (G), and blue (B) are formed in regions corresponding to intersection points where the first electrode pattern 40 and the second electrode pattern 50 cross each other in the first substrate 10. A planarization film 130 made of acryl resin, the first electrode pattern 40 composed of the ITO film, and an alignment layer 12 composed of a polyimide film are formed in order on the surfaces of the color filter 7R, 7G, and 7B. A light-shielding film 16 made of resin or a metal film is formed under the color filters 7R, 7G, and 7B. A second electrode pattern 50 composed of an ITO film, an overcoat film 29 composed of acryl resin or a silicon oxide film, and an alignment layer 22 composed of a polyimide film are formed in order on the second substrate 20. Therefore, if signals are input to the driving IC 13 through the plastic substrate 290, predetermined signals are supplied from the driving IC 13 to the first electrode pattern 40 and the second electrode 50, respectively. As a result, it is possible to drive liquid crystal 4 in the respective pixels corresponding to intersection points where the first electrode pattern 40 and the second electrode pattern 50 cross each other, thereby displaying a predetermined color image.

Manufacturing Method of Electro-optical Device 1

Figure 4:
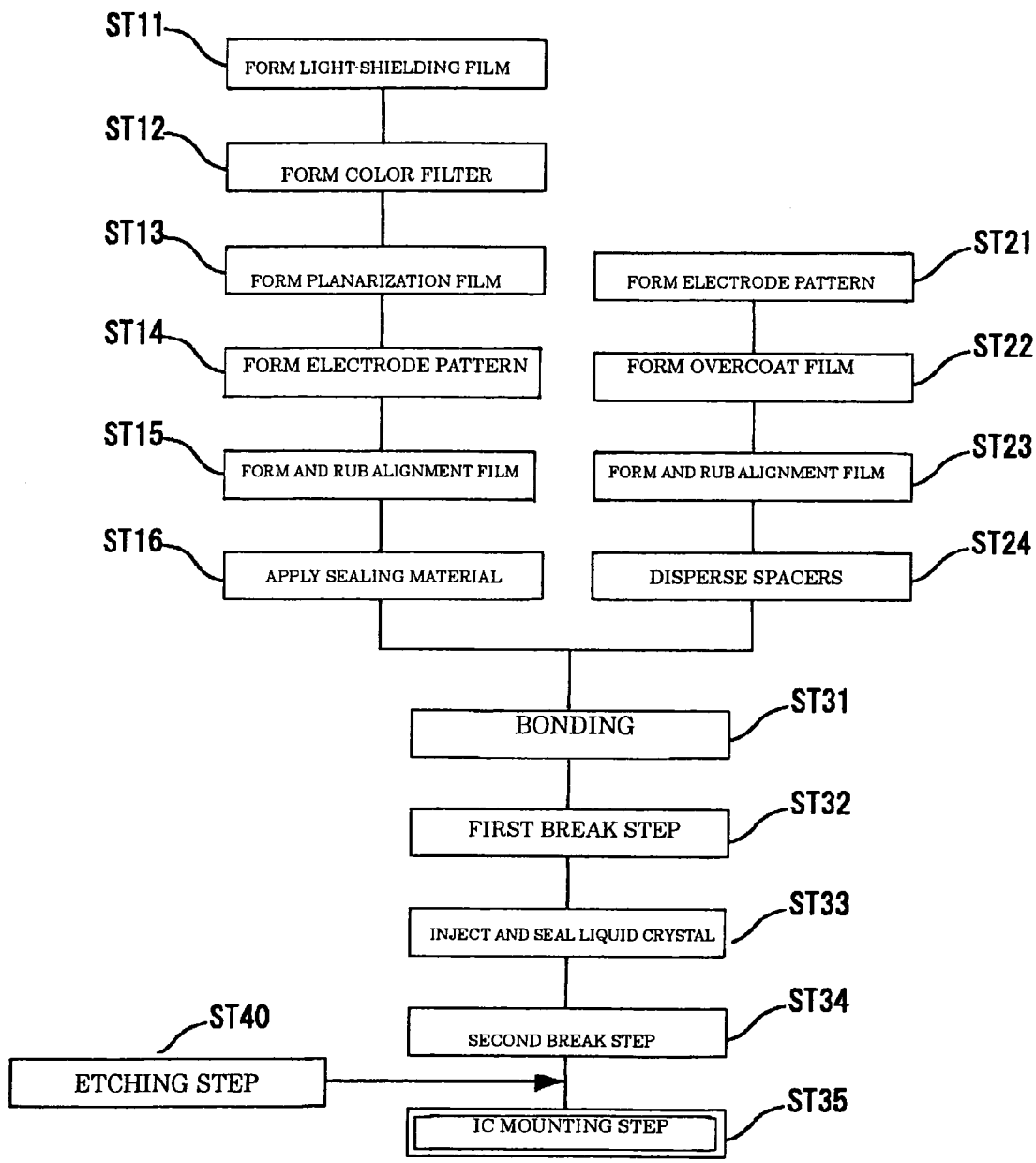
FIG. 4 is a flow chart illustrating the manufacturing process of the electro-optical device illustrated in FIG. 1.

FIG. 4 is a diagram illustrating a method of manufacturing the electro-optical device 1. FIGS. 5(A) to 5(F) are diagrams illustrating the electro-optical devices 1 in the respective processes.

Figure 5A:
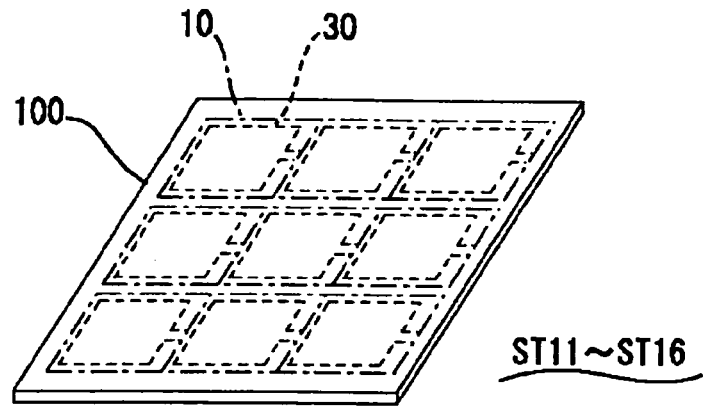
FIGS. 5(A) to 5(F) are diagrams illustrating the product during the manufacturing process of the electro-optical device illustrated in FIG. 1.
Figure 5B:
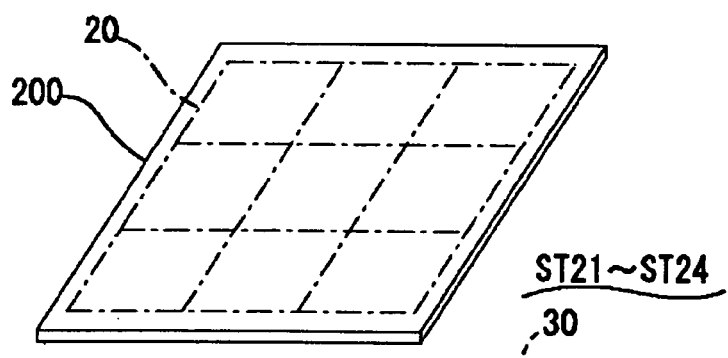

In FIG. 4 and FIGS. 5(A) and 5(B), when the electro-optical device 1 of the present embodiment is manufactured, the electrode patterns 40 and 50 are formed on large substrates 100 and 200, which will be divided into a plurality of first substrates 10 and a plurality of second substrates 20, respectively, by semiconductor processes. In other words, in the state of the large substrate 100 to be divided into a plurality of first substrates 10, the step ST11 of forming a light-shielding film 16, the step ST12 of forming color filters 7R, 7G, and 7B, the step ST13 of forming a planarization film 130, the step ST14 of forming electrode pattern 40, the step ST15 of forming an alignment film 12 and rubbing it, and the step ST16 of applying a sealing material 30 are performed using photolithography or various printing technologies.

In the state of large substrate 200 to be divided into a plurality of second substrates 20, the step ST21 of forming an electrode pattern 50, the step ST22 of forming an overcoat film 29, the step ST23 of forming an alignment film 22 and rubbing it, and the step ST24 of dispersing spacers are performed.

Figure 5C:
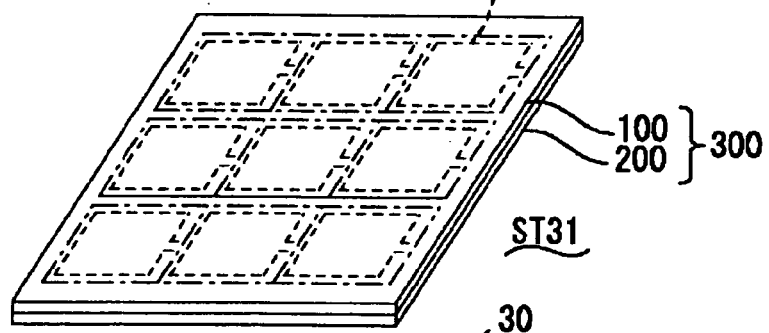

Next, in the bonding step ST31, as shown in FIG. 5(C), a large panel structure 300 is formed by bonding the large substrates 100 and 200 each other using the sealing material 30.

Figure 5D:
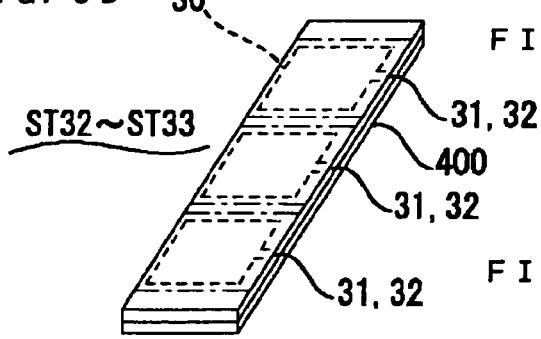

In the first break step ST32, the large panel structure 300 is cut into a rectangular-shaped panel structure 400 shown in FIG. 5(D), and then an injection hole 31 is opened. Then, lines to be cut are formed in shallow grooves on the surface of the large panel structure 100 by a diamond cutter. Next, stress is applied from the rear surface of the large substrate 200 by the jig to divide the large substrate 100. Furthermore, lines to be cut are formed in shallow grooves on the surface of the large panel structure 200 by a diamond cutter. Next, stress is applied from the surface of the large substrate 100 by the jig to divide the large substrate 200.

Next, in the step ST33 of injecting and sealing liquid crystal, liquid crystal 36 is injected into the rectangular-shaped panel structure 400, and then the injection hole 31 is sealed with a sealing material 32.

Figure 5E:
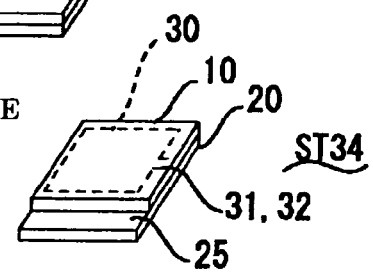

In the second break step ST34, as shown in FIG. 1 and FIG. 5(E), the panel structure 400 is cut into a single product liquid crystal panel 1' in which one end of the second substrate 20 protrudes from the first substrate 10 as a protruding region 25.

Figure 5F:
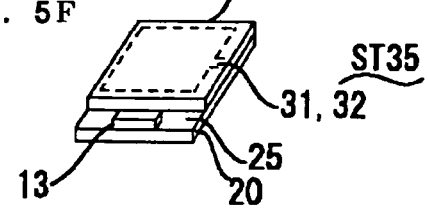

Next, in the IC mounting step ST35, as shown in FIG. 1 and FIG. 5(F), the driving IC 13 is mounted on the protruding region 25 of the single product liquid crystal panel 1'.

After the IC mounting step ST35, a plastic substrate 290 is mounted on the protruding region 25 of the single liquid panel 1'.

First Embodiment

Figure 6A:
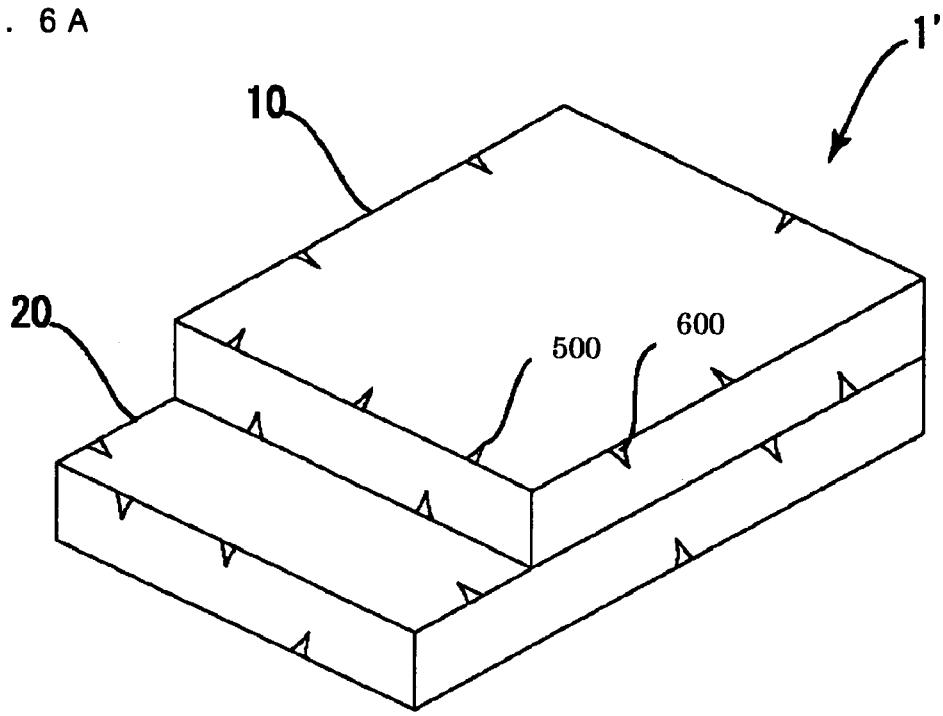
FIGS. 6(A) and 6(B) are a diagram illustrating schematically a state where fine scratches or cracks are made on a substrate constituting a liquid crystal panel and a diagram illustrating a state where the fine scratches or cracks are removed by etching in the course of the manufacturing process of the electro-optical device illustrated in FIG. 1, respectively.
Figure 6B:
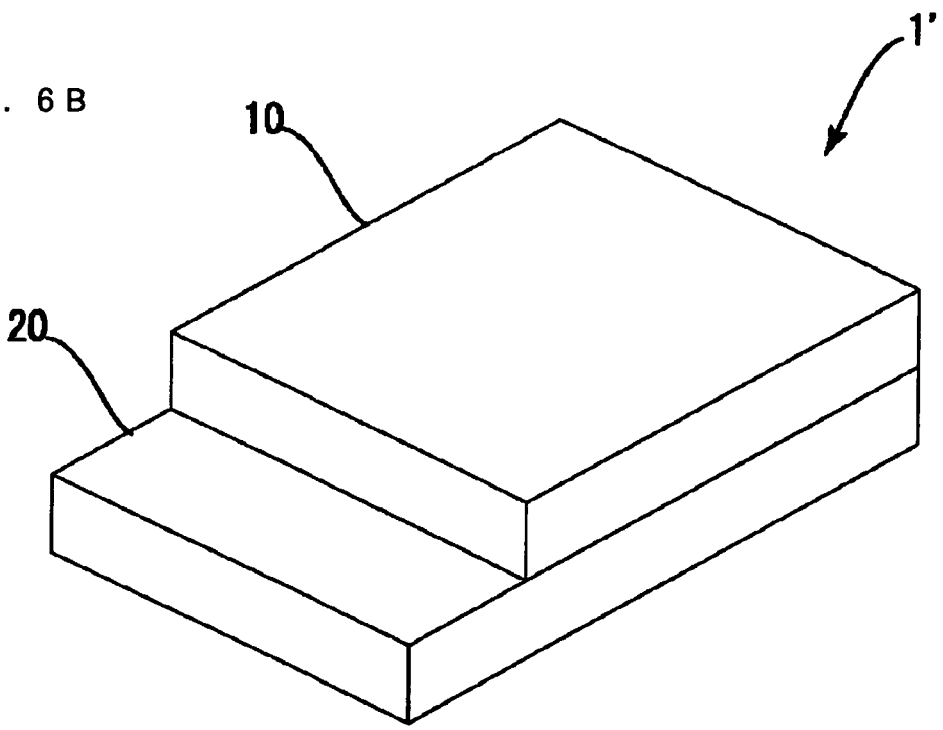
Figure 7A:
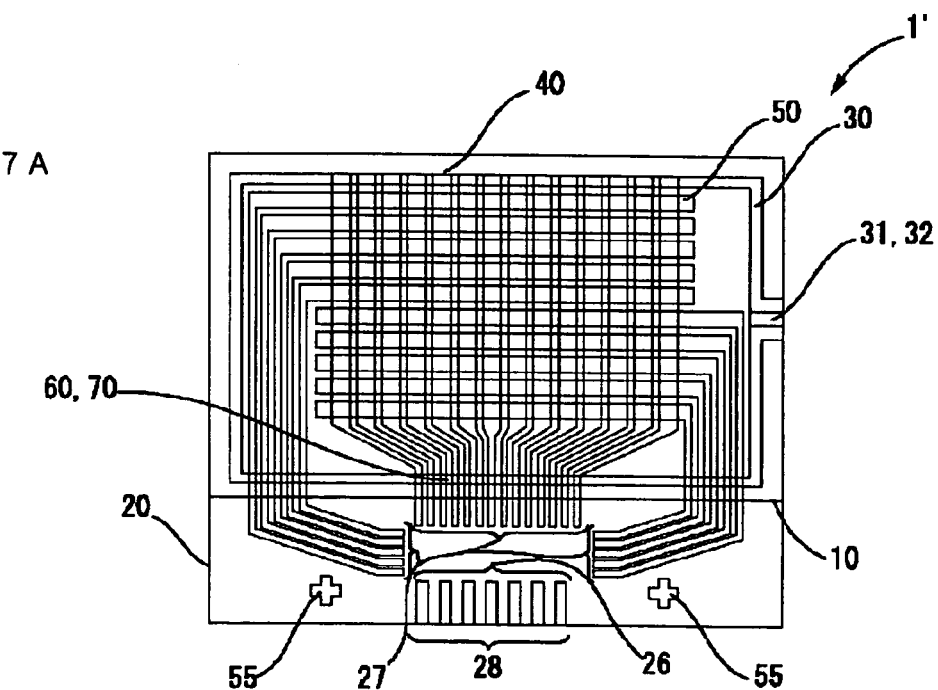
FIGS. 7(A) and 7(B) are a plan view and a cross-sectional view illustrating a liquid crystal panel in the course of the manufacturing process of the electro-optical device illustrated in FIG. 1, respectively.
Figure 7B:
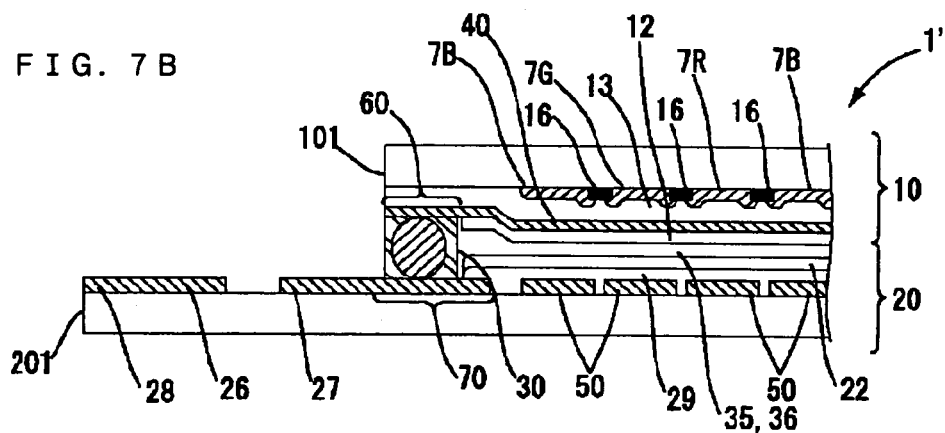
Figure 8A:
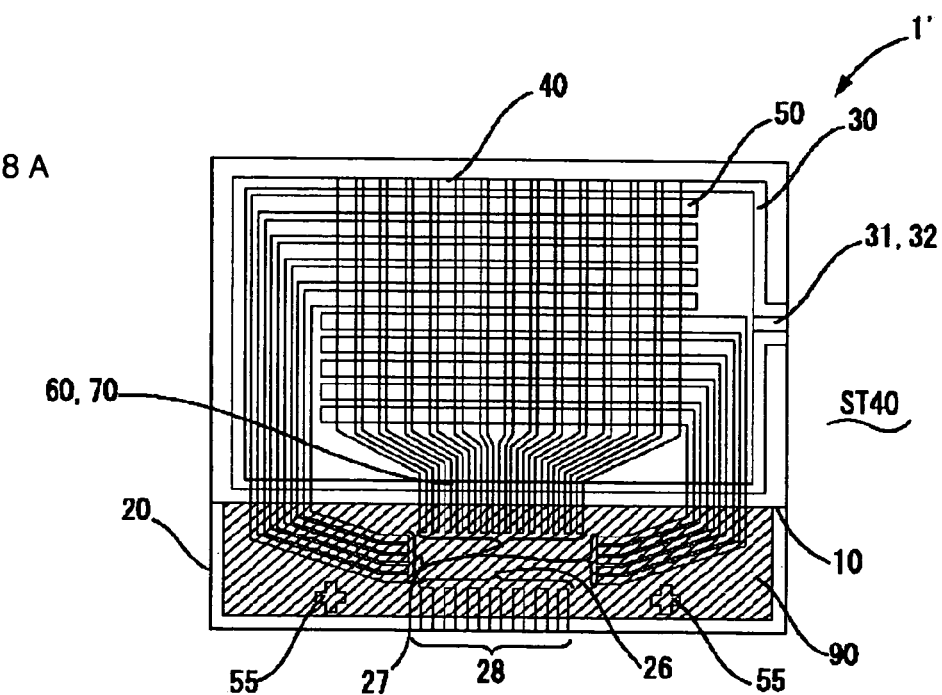
FIGS. 8(A) and 8(B) are a plan view and a cross-sectional view illustrating a state where a protection layer is formed when etching is performed on the liquid crystal panel in the course of the manufacturing process of the electro-optical device illustrated in FIG. 1, respectively.
Figure 8B:
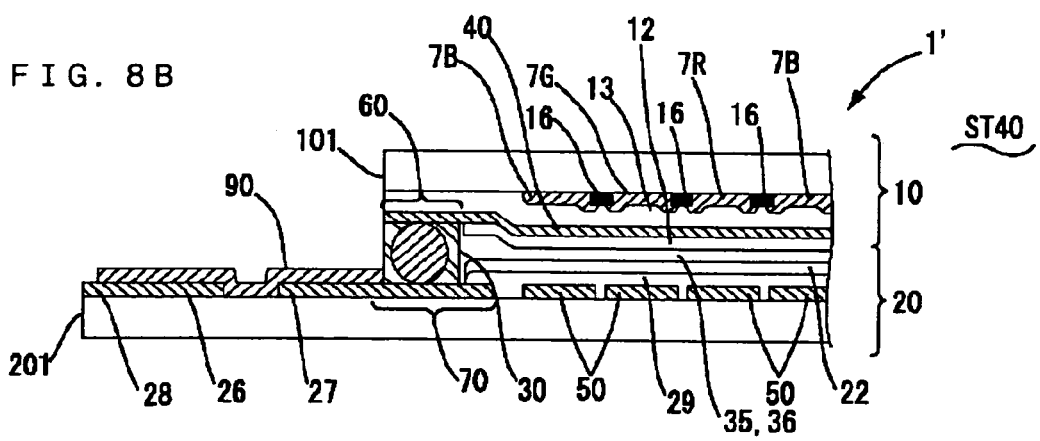
Figure 9A:
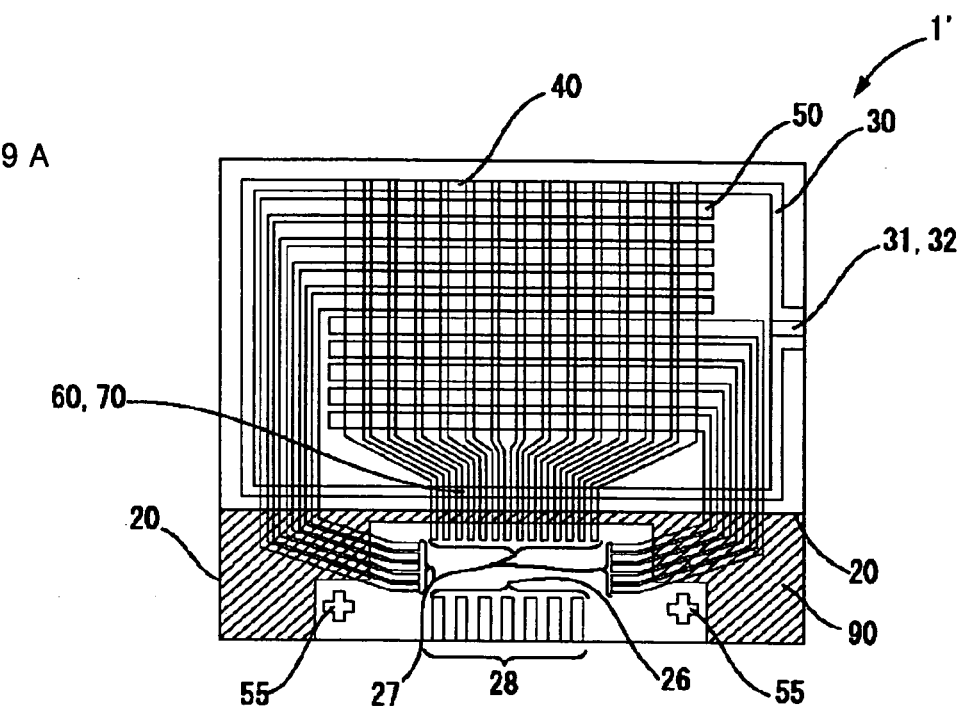
FIGS. 9(A) and 9(B) are a plan view and a cross-sectional view illustrating a state where a portion of the protection layer remains after etching is performed on the liquid crystal panel in the course of the manufacturing process of the electro-optical device illustrated in FIG. 1, respectively.
Figure 9B:
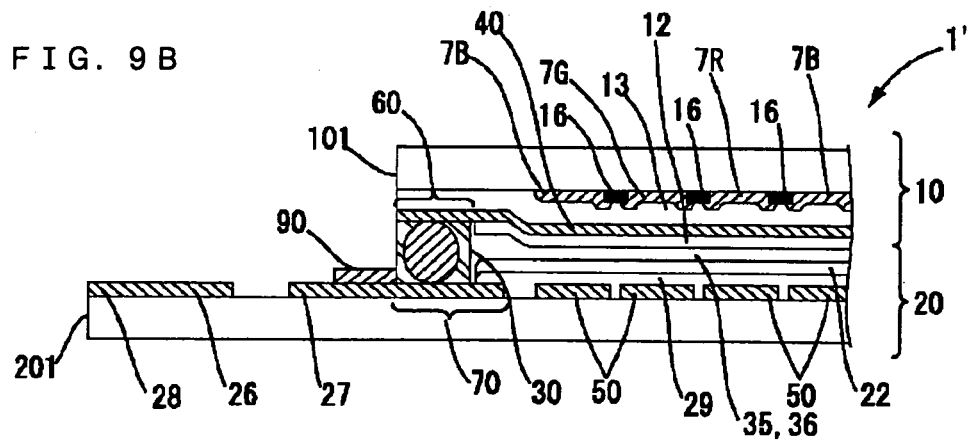

FIG. 6(A) is a diagram schematically illustrating fine scratches or cracks made on the substrate constituting the liquid panel 1', and FIG. 6(B) is a diagram illustrating a state where the fine scratches or cracks are removed from the substrate by an etching step. FIGS. 7(A) and 7(B) are a plan view and a cross-sectional view of the liquid crystal panel during the manufacturing processes for an electro-optical device, respectively. FIGS. 8(A) and 8(B) are a plan view and a cross-sectional view showing a state where a protection layer is formed when an etching step is performed on the liquid crystal panel in the manufacturing processes of the electro-optical device, respectively. FIGS. 9(A) and 9(B) are a plan view and a cross-sectional view showing a state where a part of the protection layer remains after the etching step is performed on the liquid crystal panel in the manufacturing processes of the electro-optical device, respectively. FIGS. 10(A) to 10(D) show graphs illustrating the effects of the etching step performed on the liquid crystal panel during the manufacturing processes of the electro-optical device.

When the liquid crystal device 1 is manufactured, fine scratches are made on the cut faces and the edges of the first substrate 10 and the second substrate 20, which constitute the liquid crystal panel 1', when a single product liquid crystal panel 1' is formed in the second break step ST34 as shown in FIGS. 4 and 5(E). As shown in FIG. 6(A), the scratches referred in the present invention include fine scratches 500 and cracks 600. In FIGS. 4 and 5(F), a large substrate is cut into a single product liquid crystal panel 1' in the second break step ST34. Then, the wet-etching step is performed on the edges and the cut faces of the first substrate 10 and the second substrate 20 to remove the outer layer of the substrates in a state of the single product liquid crystal panel 1' before the driving IC 13 is mounted on the protruding region 25 of the single product liquid crystal panel 1' in the IC mounting step ST35 shown in FIGS. 4 and 5(F). Thus, as shown in FIG. 6(B), fine scratches or cracks are removed from the cut faces and the edges of the substrates (the etching step ST40). Furthermore, during the process of manufacturing the electro-optical device 1, scratches or cracks may be formed on other surfaces of the substrates as well as on the cut faces and the edges of the first substrate 10 and the second substrate 20. In order to remove scratches or cracks, etching is preferably performed on other exposed surfaces as well as on the cut faces and the edges of the first substrate 10 and the second substrate 20 in the etching step ST40.

An etching solution is, for example, a hydrofluoric acid-based chemical. For example, the etching solutions, such as a hydrofluoric acid solution, a sulfur fluoride solution, hydrosilicofluoric acid, ammonium fluoride, and hydrofluoric acid, can be used. Also, aqueous solution containing the above solutions can be used. For example, the etching solution is selected from a group consisting of mixed aqueous solution of hydrofluoric acid and nitric acid, a mixed aqueous solution of hydrofluoric acid and ammonium fluoride, a mixed aqueous solution of hydrofluoric acid, ammonium fluoride and nitric acid, an aqueous solution of hydrofluoric acid and ammonium hydrodifluoride, and an aqueous solution of hydrofluoric acid, ammonium hydrodifluoride and nitric acid. In addition, strong alkaline medicinal fluid containing sodium hydroxide or potassium hydroxide may be used for the etching solution although the alkaline medicinal fluid has a low etching speed.

In the single product crystal panel 1', as shown in FIG. 2, and FIGS. 7(A) and 7(B), when etching is performed in a state where the wiring portions 51 and 71, the IC mounting terminals 26 and 27, the substrate mounting terminals 28, and the alignment marks 55 are exposed from the protruding region 25, the wiring portions 51 and 71, the IC mounting terminals 26 and 27, and the substrate mounting terminals 28 are etched and damaged by the etching solution. In the present embodiment, as illustrated in FIGS. 8(A) and (B), the protruding region 25 is covered with a protection layer 90 (a region indicated by oblique lines having a narrow pitch), and then a wet etching step is performed thereon (the etching step ST40).

In this embodiment, an adhesive tape is adhered as the protection layer 90 to the inner region of the edge of the second substrate 20 in the protrusion region 25 of the second substrate 20. Accordingly, even if the adhesive tape is adhered to the first substrate 10 as the protection layer 90, the etching step is performed in a state where the entire outer surfaces, edges, and cut faces (side surfaces) of the first substrate 10 are exposed. In addition, although the adhesive tape is adhered to the second substrate 20 as the protection layer 90, the etching step is performed in a state where the entire outer surface, edge, and cut face (side surfaces) of the second substrate 20 are exposed. As a result, in the first and second substrates 10 and 20, the outer layers of the etched portions are thinly peeled off, and thus fine scratches or cracks are removed.

As shown in FIGS. 8(A) and 8(B), the circumferential portion of the substrate mounting terminals 28 is slightly exposed from the protection layer 90, and thus the exposed portion is eroded and damaged. However, since most of the substrate mounting terminals 28 are covered with the protection layer 90, there is no difficulty in mounting the plastic substrate 290 thereon.

After the etching step ST40, the liquid crystal panel 1' is washed and dried, and then the protection layer 90 is completely removed as shown in FIGS. 7(A) and 7(B). Thereafter, the driving IC 13 is mounted on the protruding region 25 of the single product liquid crystal panel 1' in the IC mounting step ST35 shown in FIG. 5(F).

In addition, the protection layer 90 may be partially removed. That is, as illustrated in FIGS. 9(A) and 9(B), the protection layer 90 is removed from the surfaces of the IC mounting terminals 26 and 27, the substrate mounting terminals 28, and the alignment marks 55, and the peripheral region thereof, while being maintained to cover the wiring portions 51 and 71. In such a state, the driving IC 13 may be mounted on the protruding region 25 of the single product liquid crystal panel 1' in the IC mounting step ST35 shown in FIG. 5(F). Therefore, the wiring portions 51 and 71 are covered with the protection layer 90, thereby improving weatherability.

As described above, in the present invention, etching is performed in the state of the single product panel 1'. Thus, fine scratches or cracks are removed from the entire outer surface, edge, and cut faces (side surfaces) of the first substrate 10, and also fine scratches or cracks are removed from the entire outer surface, edge, and cut faces (side surfaces) of the second substrate 20. Accordingly, as will be discussed later, after the liquid crystal device 1 is mounted on a cellular phone, fine scratches or cracks do not grow by an impact or stress. Thus, the liquid crystal panel 1' is not cracked.

In the present embodiment, when a wet etching (the etching step ST40) is performed, the wiring portions 51 and 71, the IC mounting terminals 26 and 27, the substrate mounting terminals 28, and the alignment marks 55 are covered with the protection layer 90 and do not touch with an etching solution. Therefore, the wiring portions 51 and 71, the IC mounting terminals 26 and 27, the substrate mounting terminals 28, and the alignment marks 55 are not eroded or damaged by an etching solution.

Moreover, since the etching step ST40 is performed in a state of the liquid crystal panel 1' including a pair of substrates, namely in the final stage of the manufacturing process, all scratches or cracks can be removed collectively.

FIGS. 10(A) to 10(D) show relationships between the etching depth in the etching step ST40 and the results of the intensity test for a plurality of samples. In the liquid crystal panels for the test, the first substrates 10 and the second substrates 20 have the depth of 0.5 mm.

In the test, a predetermined value of load is applied respectively to a liquid crystal panel which the etching step ST40 is not performed on, a liquid crystal panel having the etching depth of 10 µm, a liquid crystal panel having the etching depth of 50 µm, and a liquid crystal panel having the etching depth of 100 µm, and a weight is calculated at a point of time when each sample is broken. The results are shown in FIGS. 10(A) to 10(D). In each graph, the load value, on which the number of broken samples is concentrated, represents the average intensity of the liquid crystal panel etched in each level.

As shown in FIGS. 10(A) to 10(D), the intensity of the panel, on which etching is performed, is higher than that of the panel, on which etching is not performed. Thus, it is confirmed that glass substrates constituting the liquid crystal panel, from which scratches or cracks are removed by etching, have higher breaking strength. The liquid crystal panel having the etching depth of 10 µm and the liquid crystal panel having the etching depth of 50 µm show the average intensity of about 15 kg, that is, there is no great difference in the average intensity between the liquid crystal panels.

On the contrary, the liquid crystal panel having the etching depth of 100 µm shows the low average intensity of 13 kg. The reason is that scratches or cracks are removed from the glass substrates by etching, but an absolute value of the intensity of the glass substrates is reduced as compared with the liquid crystal panel having the etching depth of 10 μm and the liquid crystal panel having the etching depth of 50 μm.

As described above, since fine scratches or cracks are removed from the first substrate 10 and the second substrate 20 constituting the liquid crystal panel 1' in the etching step ST40, the breakage strength of the liquid crystal panel 1' can be improved. In addition, the etching depth of about 10 μm is required. The intensity is not improved any more within a predetermined etching depth. If the etching depth is too deep, the substrate becomes thin, and thus the intensity of the liquid crystal panel 1' is reduced.

Second Embodiment

The second to sixth embodiments have the same basic structures as the first embodiment. Accordingly, only the characteristic parts of the second to sixth embodiments will now be explained with reference to FIGS. 7 to 9, and the explanation of the same parts will be omitted.

In this embodiment, similar to the first embodiment, the liquid crystal panel 1' is cut as a single product in the second break step ST34 shown in FIG. 5(E), and then the wet etching step is performed on the cut faces and edges of the first substrate 10 and the second substrate 20 of the single product liquid crystal panel 1' before the driving IC 13 is mounted on the protruding region 25 of the single product liquid crystal panel 1' in the IC mounting step ST35 shown in FIG. 5(F), thereby removing fine scratches or cracks from the edges and the cut faces of the substrates (the etching step ST40).

In the manufacturing process of the electro-optical device 1, fine scratches or cracks may be generated on other surfaces of the first substrate 10 and the second substrate 20 as well as on the cut faces and edges of thereof. In order to remove such scratches or cracks, the etching step ST40 may be performed not only on the cut faces and edges of the first substrate 10 and the second substrate 20 but also on the other surfaces thereof. However, in this embodiment, since the wiring portions 51 and 71, the IC mounting terminals 26 and 27, the substrate mounting terminals 28, and the alignment marks 55 are exposed from the single product liquid crystal panel 1' as shown in FIGS. 7(A) and 7(B), the protruding region 25 is covered with the protection layer 90 (a region indicated by oblique lines having a narrow pitch) as shown in FIGS. 8(A) and 8(B). Then, in such a state, etching is performed thereon (etching step ST40).

In this embodiment, the liquid photoresist is selectively applied on a region, which is slightly inward region from the edge of the second substrate 20 within the protruding region 25 of the second substrate 20. Then, the photoresist is exposed and developed to form the protection layer 90 composed of a resist layer.

Accordingly, although a resist layer is formed as the protection layer 90 in the first substrate 10 and the second substrate 20, etching is performed in a state where the entire outer surface, edges, and cut faces (side surfaces) of the first substrate 10 and the second substrate 20 are exposed. In the etched portions of the first substrate 10 and the second substrate 20, the outer layers thereof are etched thinly to remove fine scratches or cracks. Moreover, when the wet etching is performed, the wiring portions 51 and 71, the IC mounting terminals 26 and 27, the substrate mounting terminals 28, and the alignment marks 55 are covered with the protection layer 90 not to contact the etching solution. Therefore, the wiring portions 51 and 71, the IC mounting terminals 26 and 27, the substrate mounting terminals 28, and the alignment marks 55 are not eroded and damaged.

After the etching step ST40 is performed, the liquid crystal panel 1' is washed and dried, and then the protection layer 90 composed of resist is completely removed by a detaching solution as shown in FIGS. 7(A) and 7(B). Thereafter, the driving IC 13 is mounted on the protruding region 25 of the single product liquid crystal panel 1' in the IC mounting step ST35 shown in FIG. 5(F).

Herein, as illustrated in FIGS. 9(A) and 9(B), the protection layer 90 is removed from the surfaces of the IC mounting terminals 26 and 27, the substrate mounting terminals 28, and the alignment marks 55, and the peripheral region thereof except for a region covering the wiring portions 51 and 71. In this state, the driving IC 13 may be mounted on the protruding region 25 of the single product liquid crystal panel 1' in the IC mounting step ST35 shown in FIG. 5(F). In this manner, since the wiring portions 51 and 71 are covered with the protection layer 90, it is possible to improve weatherability.

When such a manufacturing method is preformed, the resist may be selectively applied by a brush coating method, a screen printing method, an inkjet method, or an offset printing method. Herein, the inkjet printing method of these printing methods is a non-contact type and can selectively coat the resist on a predetermined region with high precision.

In this embodiment, the resist is used as the protection layer 90. For example, a resist layer (protection layer 90) can be selectively formed on the desired region by applying resist on the entire protruding region 25, exposing only the predetermined region, and developing the exposed region.

Third Embodiment

In this embodiment, a liquid crystal panel 1' is cut as a single product in the second break step ST34 shown in FIG. 5(E), and then the wet etching is performed on the edges and cut faces of the first substrate 10 and the second substrate 20 of the single product liquid crystal panel 1' before the driving IC 13 is mounted on the protruding region 25 of the single product liquid crystal panel 1' in the IC mounting step ST35 shown in FIG. 5(F), thereby removing fine scratches or cracks from the edges and the cut faces of the substrates (etching step ST40). In the manufacturing process of an electro-optical device 1, fine scratches or cracks may be generated on the cut faces and edges of the first substrate 10 and the second substrate 20 as well as on other surfaces thereof. In order to remove such scratches and cracks, the etching step ST40 can be performed not only on the cut faces and edges of the first substrate 10 and the second substrate 20 but also on the other surfaces thereof.

However, in this embodiment, the wiring portions 51 and 71, the IC mounting terminals 26 and 27, the substrate mounting terminals 28, and the alignment marks 55 are exposed from the single product liquid crystal panel 1' as shown in FIGS. 7(A) and 7(B). Thus, as shown in FIGS. 8(A) and (B), etching is performed in a state where the protruding region 25 is covered with the protection layer 90 (a region indicated by oblique lines having a narrow pitch) (etching step ST40).

In this embodiment, when the protection layer 90 is formed, liquid paints are selectively applied on a region, which is a slightly inward area from the edge of the second substrate 20 within the protruding region 25 of the second substrate 20 by a brush coating method, a screen printing method, an inkjet method, or an offset printing method, and then the liquid paints are solidified to form the protection layer 90 composed of a paint film.

Accordingly, in the present invention, although the paint film is formed as the protection layer 90 in the first substrate 10 and the second substrate 20, etching is performed in a state where the entire outer surface, edges, and cut faces (side surfaces) of the first substrate 10 and the second substrate 20 are exposed. Thus, in the etched regions of the first substrate 10 and the second substrate 20, the outer layers are etched thinly to remove fine scratches or cracks. Moreover, when the wet etching is performed, the wiring portions 51 and 71, the IC mounting terminals 26 and 27, the substrate mounting terminals 28, and the alignment marks 55 are covered with the protection layer 90 not to contact the etching solution. Therefore, the wiring portions 51 and 71, the IC mounting terminals 26 and 27, the substrate mounting terminals 28, and the alignment marks 55 are not eroded or damaged.

After the etching step ST40, the liquid crystal panel 1' is washed and dried, and then the protection layer 90 composed of the paint film is completely removed by a detaching solution composed of an organic solvent as shown in FIGS. 7(A) and 7(B). Thereafter, the driving IC 13 is mounted on the protruding region 25 of the single product liquid crystal panel 1' in the IC mounting step ST35 shown in FIG. 5(F).

At this time, as illustrated in FIGS. 9(A) and 9(B), the protection layer 90 is removed from the surfaces of the IC mounting terminals 26 and 27, the substrate mounting terminals 28, and the alignment marks 55, and the peripheral region thereof except for a region covering the wiring portions 51 and 71. In this state, the driving IC 13 may be mounted on the protruding region 25 of the single product liquid crystal panel 1' in the IC mounting step ST35 shown in FIG. 5(F). In this way, since the wiring portions 51 and 71 are covered with the protection layer 90, it is possible to improve weatherability.

Fourth Embodiment

In this embodiment, a liquid crystal panel 1' is cut as a single product in the second break step ST34 shown in FIG. 5(E), and then the wet etching is performed on the edges and the cut faces of the first substrate 10 and the second substrate 20 of the single product liquid crystal panel 1' before the driving IC 13 is mounted on the protruding region 25 of the single product liquid crystal panel 1' in the IC mounting step ST35 shown in FIG. 5(F), thereby removing fine scratches or cracks from the edges and the cut faces of the substrates (etching step ST40). Furthermore, in the manufacturing process of the electro-optical device 1, fine scratches or cracks may be generated not only on the cut faces and edges of the first substrate 10 and the second substrate 20 but also on the other surfaces thereof. In order to remove such scratches or cracks, etching may be performed not only on the cut faces and edges of the first substrate 10 and the second substrate 20 but also on the other surfaces thereof in the etching step ST40.

However, in this embodiment, the wiring portions 51 and 71, the IC mounting terminals 26 and 27, the substrate mounting terminals 28, and the alignment marks 55 are exposed from the single product liquid crystal panel 1' as shown in FIGS. 7(A) and 7(B). Thus, as shown in FIGS. 8(A) and 8(B), etching is performed in a state where the protruding region 25 is covered with the protection layer 90 (a region indicated by oblique lines having a narrow pitch) (etching step ST40).

In this embodiment, when the protection layer 90 is formed, the step of forming and rubbing an alignment film ST23 is used. That is, polyimide is applied and hardened on the entire surface of the second substrate 20 by a spin coating method or various other printing methods. When polyimide selectively remains as the alignment film 22 in the regions partitioned by the sealing material 30 using an oxygen plasma process, the polyimide film also selectively remains as the protection layer 90 in a slightly inward area from the edge of the second substrate 20 within the protruding region 25 of the second substrate 20.

Accordingly, in this embodiment, although polyimide (alignment film 22) is formed as the protection layer 90 in the first substrate 10 and the second substrate 20, etching is performed in a state where the entire outer surface, edges and cut faces (side surfaces) of the first substrate 10 and the second substrate 20 are exposed. Thus, in the etched regions of the first substrate 10 and the second substrate 20, the outer layers are etched thinly to remove fine scratches and cracks. Moreover, when the wet etching is performed, the wiring portions 51 and 71, the IC mounting terminals 26 and 27, the substrate mounting terminals 28, and the alignment marks 55 are covered with the protection layer 90 not to contact the etching solution. Therefore, the wiring portions 51 and 71, the IC mounting terminals 26 and 27, the substrate mounting terminals 28, and the alignment marks 55 are not eroded or damaged.

After the etching step ST40, the liquid crystal panel 1' is washed and dried, and then the protection layer 90 made of polyimide is completely removed by the oxygen plasma process as shown in FIGS. 7(A) and 7(B). Thereafter, the driving IC 13 is mounted on the protruding region 25 of the single product liquid crystal panel 1' in the IC mounting step ST35 shown in FIG. 5(F).

At this time, as illustrated in FIGS. 9(A) and 9(B), the protection layer 90 is removed from the surfaces of the IC mounting terminals 26 and 27, the substrate mounting terminals 28, and the alignment marks 55, and the peripheral region thereof except for a region covering the wiring portions 51 and 71. In this state, the driving IC 13 may be mounted on the protruding region 25 of the single product liquid crystal panel 1' in the IC mounting step ST35 shown in FIG. 5(F). Therefore, since the wiring portions 51 and 71 are covered with the protection layer 90, it is possible to improve weatherability.

In this embodiment, polyimide formed simultaneously with polyimide (an organic insulation film), which is formed as the alignment film 22 in regions partitioned by the sealing material 30, is used as the protection layer 90. Accordingly, since an additional step of forming the protection layer 90 is not required, it is possible to keep the number of manufacturing processes minimum.

When the overcoat layer 29 is formed on the second substrate 20 as an organic insulation film (a step of forming an overcoat layer), resin composing the overcoat layer 29 can be formed on the protruding region 25 as the protection layer 90. In addition, the color filters 7R, 7G, and 7B may be formed on the second substrate 20. Therefore, resin composing the color filters 7R, 7G, and 7B may be formed on the protruding region 25 as the protection layer 90.

When an inorganic insulation film is selectively formed on regions partitioned by the sealing material 30, for example, when the overcoat layer 29 is formed of the inorganic insulation film such as a silicon oxide film, an inorganic insulation film such as a silicon oxide film, which is formed simultaneously with the inorganic insulation film, may be used as the protection layer 90. In this case, when the inorganic insulation film is etched later, an etching solution having a high etching selection ratio of the inorganic insulation film to a material composing the wiring portions 51 and 71 is preferably used.

Fifth Embodiment

In this embodiment, a liquid crystal panel 1' is cut as a single product in the second break step ST34 shown in FIG. 5(E), and then the wet etching step is performed on the edges and the cut faces of the first substrate 10 and the second substrate 20 of the single product liquid crystal panel 1' before the driving IC 13 is mounted on the protruding region 25 of the single product liquid crystal panel 1' in the IC mounting step ST35 shown in FIG. 5(F), thereby removing fine scratches or cracks from the edges and the cut faces of the substrates as shown in FIG. 6(B) (etching step ST40). In the manufacturing processes of the electro-optical device 1, fine scratches or cracks may be generated not only on the cut faces and edges of the first substrate 10 and the second substrate 20 but also on the other surfaces thereof. In order to remove such scratches or cracks, etching may be performed not only on the cut faces and edges of the first substrate 10 and the second substrate 20 but also on the other exposed surfaces thereof in the etching step ST40.

However, in this embodiment, the wiring portions 51 and 71, the IC mounting terminals 26 and 27, the substrate mounting terminals 28, and the alignment marks 55 are exposed from the single product liquid crystal panel 1' as shown in FIGS. 7(A) and 7(B). Thus, as shown in FIGS. 8(A) and 8(B), etching is performed in a state where the protruding region 25 is covered with the protection layer 90 (a region indicated by oblique lines having a narrow pitch) (etching step ST40).

In this embodiment, a liquid material obtained by dissolving a water repellent agent in a solvent is selectively applied in a slightly inward area from the edge of the second substrate 20 within the protruding region 25 of the second substrate 20, and then the solvent is evaporated and removed to form the protection layer 90 composed of a water repellent agent.

Accordingly, in the present embodiment, although a water repellent agent is formed as the protection layer 90 in the first substrate 10 and the second substrate 20, etching is performed on the entire outer surface, edges, and cut faces (side surfaces) of the first substrate 10 and the second substrate 20, which are hydrophilic. Thus, in the etched regions of the first substrate 10 and the second substrate 20, the outer layers are etched thinly to remove fine scratches or cracks. Furthermore, when the wet etching is performed, the wiring portions 51 and 71, the IC mounting terminals 26 and 27, the substrate mounting terminals 28, and the alignment marks 55 are covered with the protection layer 90 not to contact the etching solution. Therefore, the wiring portions 51 and 71, the IC mounting terminals 26 and 27, the substrate mounting terminals 28, and the alignment marks 55 are not eroded or damaged.

Herein, the water repellent agent is selectively applied by a brush coating method, a screen printing method, an inkjet method, or an offset printing method. The inkjet method of these printing methods is a non-contact type and can selectively apply paints in the desired region with high precision.

After the etching step ST40, the liquid crystal panel 1' is washed and dried, and then all or a portion of the water repellent agent may be removed. The water repellent agent is formed as a very thin layer. Therefore, even if the protection layer 90 remains, there is no difficulty in mounting the driving IC 13 and the plastic substrate 290 on the protruding region 25 of the single product liquid crystal panel 1'.

Sixth Embodiment

In this embodiment, a liquid crystal panel 1' is cut as a single product in the second break step ST34 shown in FIG. 5(E), and then the wet etching is performed on the edges and the cut faces of the first substrate 10 and the second substrate 20 of the single product crystal panel 1' before the driving IC 13 is mounted on the protruding region 25 of the single product crystal panel 1' in the IC mounting step ST35 shown in FIG. 5(F), thereby removing fine scratches or cracks from the edges and the cut faces of the substrates as shown in FIG. 6(B) (etching step ST40).

In the manufacturing process of the electro-optical device 1, fine scratches or cracks may be generated not only on the cut faces and edges of the first substrate 10 and the second substrate 20 but also on the other surfaces thereof. In order to remove such scratches or cracks, etching may be performed not only on the cut faces and edges of the first substrate 10 and the second substrate 20 but also on the other surfaces thereof in the etching step ST40.

However, in this embodiment, the wiring portions 51 and 71, the IC mounting terminals 26 and 27, the substrate mounting terminals 28, and the alignment marks 55 are exposed from the single product liquid crystal panel 1' as shown in FIGS. 7(A) and 7(B). Thus, as shown in FIGS. 8(A) and 8(B), etching is performed in a state where the protruding region 25 is covered with the protection layer 90 (a region indicated by oblique lines having a narrow pitch) (etching step ST40).

In the present embodiment, an anisotropic conductive film, which is obtained by dispersing conductive particles in thermoplastic resin, is selectively applied on a slightly inward area from the edge of the second substrate 20 within the protruding region 25 of the second substrate 20, and it is used as the protection layer 90.

Accordingly, in the present embodiment, although the anisotropic conductive film is formed as the protection layer 90 in the first substrate 10 and the second substrate 20, etching is performed in a state where the entire outer surface, edges, and cut faces (side surfaces) of the first substrate 10 and the second substrate 20 are exposed. In the etched regions of the first substrate 10 and the second substrate 20, the outer layers are etched thinly to remove fine scratches or cracks. Furthermore, when the wet etching is performed, the wiring portions 51 and 71, the IC mounting terminals 26 and 27, the substrate mounting terminals 28, and the alignment marks 55 are covered with the protection layer 90 not to contact the etching solution. Therefore, the wiring portions 51 and 71, the IC mounting terminals 26 and 27, the substrate mounting terminals 28, and the alignment marks 55 are not eroded or damaged.

Herein, the anisotropic conductive film may be selectively applied using a dispenser or by an inkjet method or an offset printing method. Here, the inkjet method of these printing methods is a non-contact type and can selectively apply paints on the desired region with high precision.

After the etching step ST40, the liquid crystal panel 1' is washed and dried, and then the protection layer 90 composed of the anisotropic conductive film remains as it is. Then, it is used to mount the driving IC 13 and the plastic substrate 290 on the protruding region 25 of the single product liquid crystal panel 1'.

Here, the anisotropic conductive film is applied on the surface of the region where the wiring portions 51 and 71 are formed in parallel. However, the conductive particles are small as seen from the pitches of the wiring portions 51 and 71, and thus a short circuit is prevented. Conversely, the wiring portions 51 and 71 are protected by the protection layer 90 composed of the anisotropic conductive film.

Seventh Embodiment

Figure 12A:
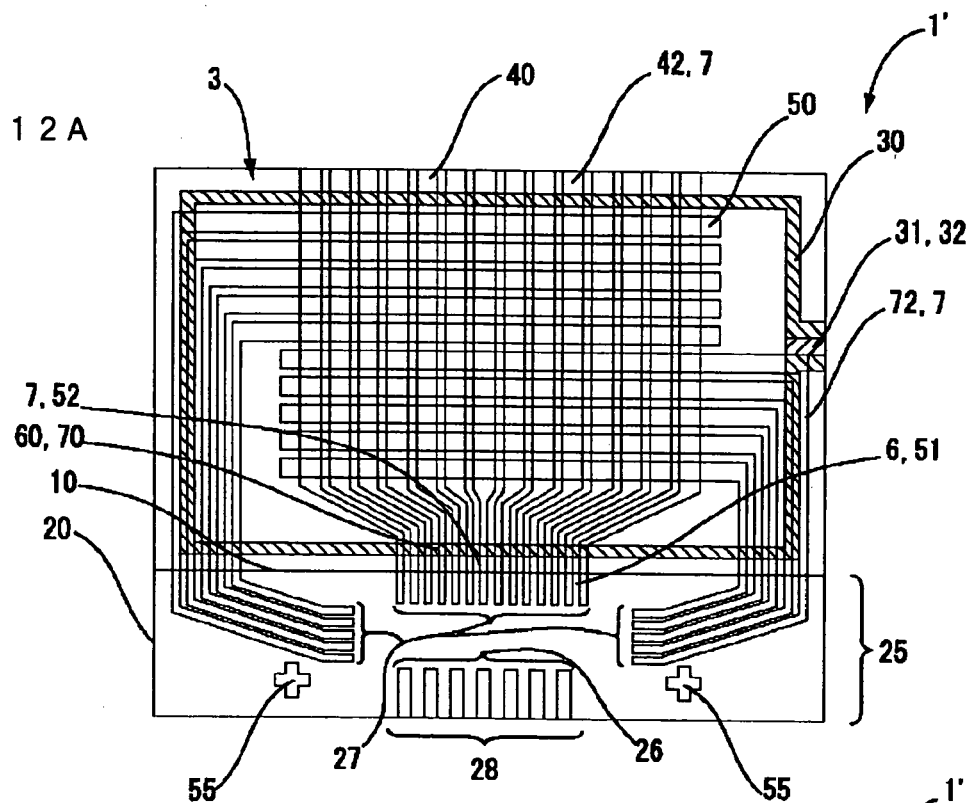
FIGS. 12(A) and 12(B) are a plan view and a cross-sectional view illustrating a liquid crystal panel in the course of the manufacturing process of the electro-optical device according to the first embodiment of the present invention, respectively.
Figure 12B:
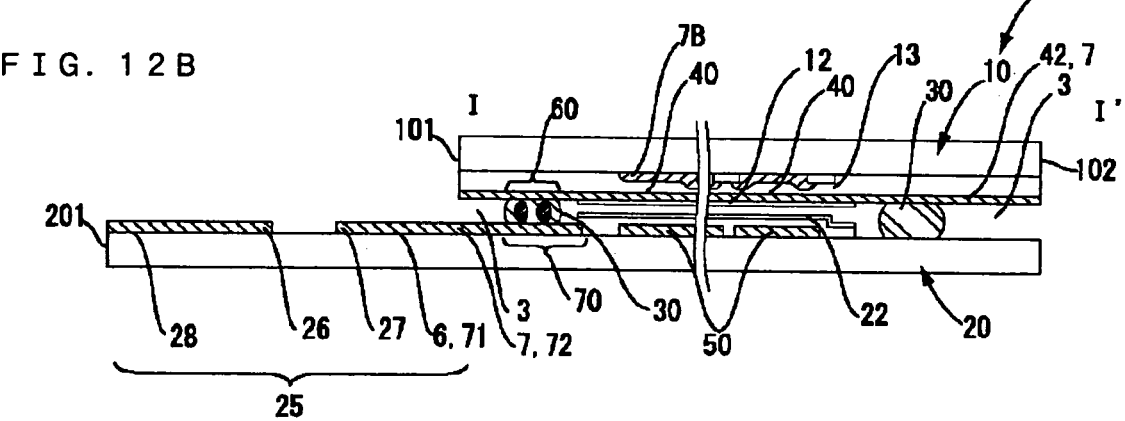
Figure 13A:
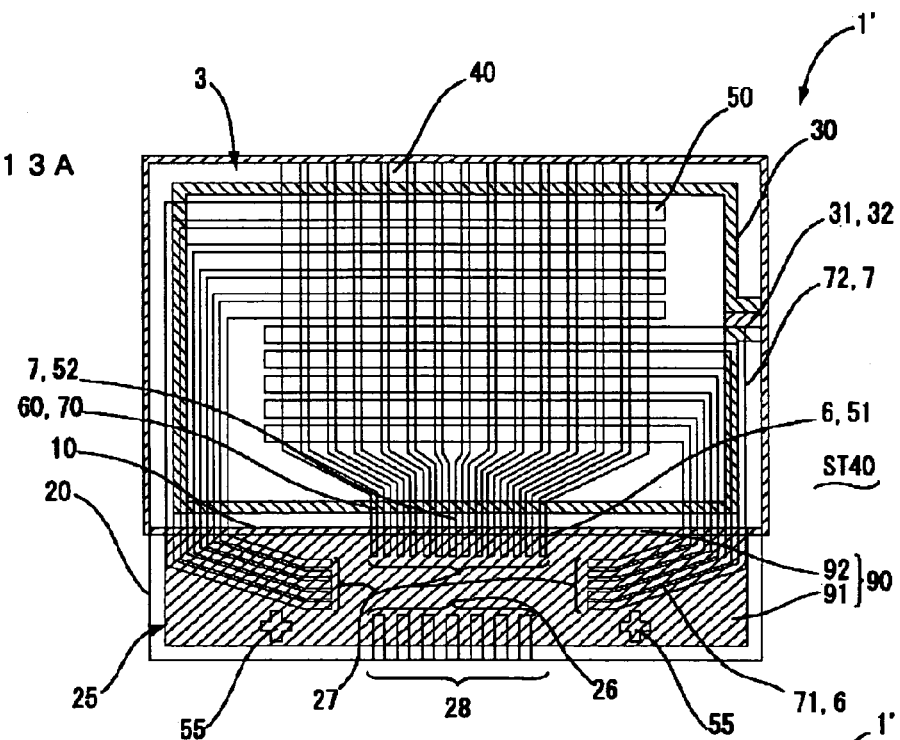
FIGS. 13(A) and 13(B) are a plan view and a cross-sectional view illustrating a state where the protection layer is formed when etching is performed on the liquid crystal panel in the course of the manufacturing process of the electro-optical device according to the first embodiment of the present invention, respectively.
Figure 13B:
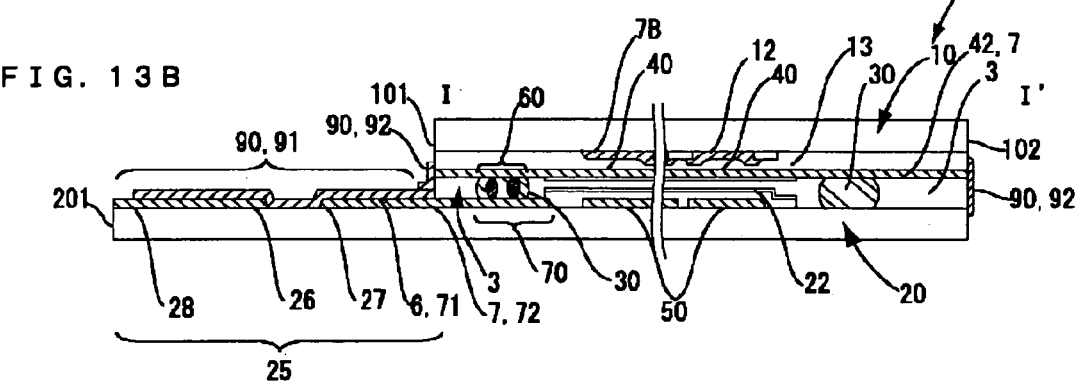
Figure 14A:
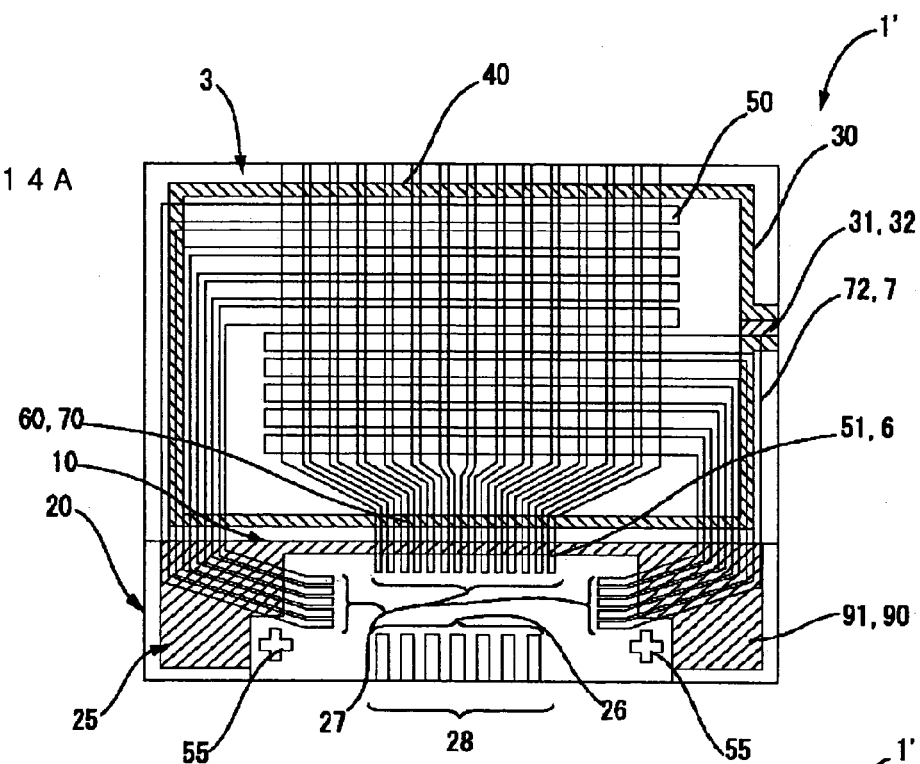
FIGS. 14(A) and 14(B) are a plan view and a cross-sectional view illustrating a state where a portion of the protection layer remains after etching is performed on the liquid crystal panel in the course of the manufacturing process of the electro-optical device according to the first embodiment of the present invention, respectively.
Figure 14B:
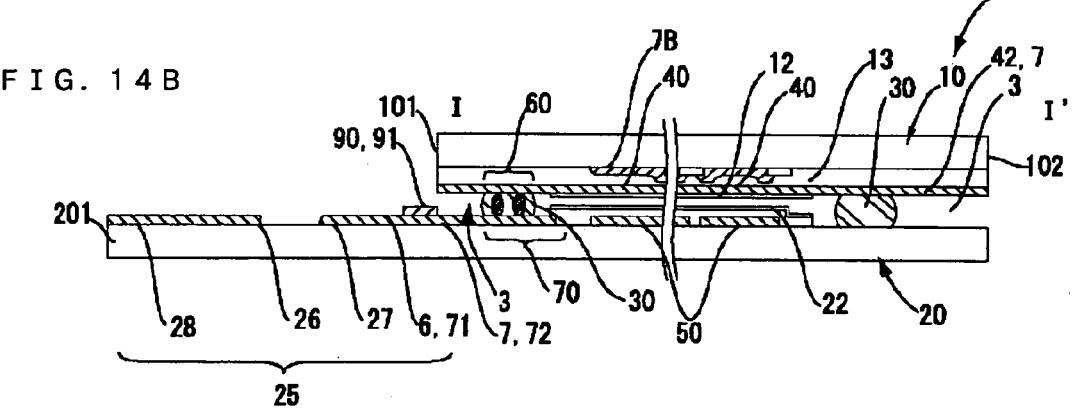

FIGS. 12(A) and 12(B) are a plan view and a cross-sectional view illustrating the liquid crystal panel in the process for manufacturing the electro-optical device according to the present invention, respectively. FIGS. 13(A) and 13(B) are a plan view and a cross-sectional view illustrating the protection layer formed when the liquid crystal panel is etched in the process for manufacturing the electro-optical device according to the present invention, respectively. FIGS. 14(A) and 14(B) are a plan view and a cross-sectional view illustrating the protection layer partially left after the liquid crystal panel is etched in the process for manufacturing the electro-optical device, respectively.

Furthermore, in this embodiment, a liquid crystal panel 1' is cut as a single product in the second break step ST34 illustrated in FIG. 4 and FIG. 5(E). Then, before the driving IC 13 is mounted on the protruding region 25 of the single product liquid crystal panel 1' in the IC mounting step illustrated in FIG. 4 and FIG. 5(F), in a state of the single product liquid crystal panel 1', a wet etching is performed on the edges and the cut faces of the first and second substrates 10 and 20 to remove their outer surfaces. Accordingly, as shown in FIG. 6(B), fine scratches or cracks are removed from the edges and the cut faces of the substrates (etching step ST40).

However, as illustrated in FIGS. 1, 11(A), 11(B), 12(A), and 12(B), in the liquid crystal panel 1', when etching is performed in a state where the wiring portions 51 and 71, IC mounting terminals 26 and 27, substrate mounting terminals 28, and alignment marks 55 are exposed in the protruding region 25 of the second substrate 20, the wiring portions 51 and 71, IC mounting terminals 26 and 27, substrate mounting terminals 28, and alignment marks 55 are eroded, damaged and removed by an etching solution.

Further, in the liquid crystal panel 1', a sealing material 30 is formed at the inside area rather than the outer periphery of the first substrate 10. Thus, the outer periphery of the sealing material 30 includes a gap 3 between the first and second substrates 10 and 20, which runs through the outside and formed along the outside edge of the first substrate 10 (see FIGS. 11(A) and 11(B), and FIGS. 12(A) and 12(B)), and an end portion 42 of the first electrode pattern 40 at the edge side 102 of the first substrate 10, and portions 52 and 72 of the wiring portions 51 and 71 of the second substrate 20 are positioned at the gap 3. Accordingly, if etching is performed in such a state, the etching solution is injected into the gap 3 formed at the outer periphery of the sealing material 30, and portions 52 and 72 of the wiring portions 51 and 71, and the end portion 42 of the first electrode pattern 40 are eroded. Here, in order to discharge static electricity to the outside even after forming the liquid crystal panel 1', the first electrode pattern 40 of the first substrate 10 reaches the end portion 42 of the edge 201 of the first substrate 10.

Also, in the following explanation, among the wiring portions 51 and 71, portions 52 and 72 of the wiring portions, and the end portion 42 of the first electrode 40, the wiring portions 51 and 71 exposed from the protruding region 25 are indicated as a first wiring 6, and the portions 52 and 72 of the wiring portions and the end portion 42 of the first electrode 40 positioned within the gap 3 are indicated as a second wiring 7.

In this embodiment, in order to prevent the wirings 6 and 7 from eroding, after the liquid crystal panel 1' is cut as a single product in the second break step ST34, the protruding region 25 and the gap 3 are covered with the protection layer 90 before the etching step ST40 is performed as illustrated in FIGS. 13(A) and 13(B) (a hatched area at the upper right side with a narrow pitch), and then the wet etching is performed.

In the present embodiment, in view of the protection layer 90, a tape is attached as a first protection layer 91 to a slightly inward area from the edge of the second substrate 20 within the protruding region 25 of the second substrate 20. As a result, the first wiring 6 (wiring portions 51 and 71), IC mounting terminals 26 and 27, the substrate mounting terminals 28, and the alignment marks 55 are covered with the first protection layer 91.

Also, in this embodiment, in view of the protection layer 90, a tape as the protection layer 92 is attached along the edge of the first substrate 10 so as to seal the opening of the gap 3. As a result, the second wiring 7 (portions 52 and 72 of the wiring portions 51 and 71, the end portion 42 of the first electrode pattern 40) positioned within the gap 3 is covered with the second protection layer 92. Here, the second protection layer 92 is formed such that the cut faces of first and second substrates 10 and 20 may be exposed as much as possible.

Then, the etching step ST40 is performed in this state. Here, the etching solution used is, for example, a hydrofluoric acid-based medicinal fluid. For example, the etching solutions, such as a hydrofluoric acid solution, a sulfur fluoride solution, hydrosilicofluoric acid, ammonium fluoride, and hydrofluoric acid, can be used. Also, an aqueous solution including these can be used. For example, the etching solution is selected from a group consisting of mixed aqueous solution of hydrofluoric acid and nitric acid, a mixed aqueous solution of hydrofluoric acid and ammonium fluoride, a mixed aqueous solution of hydrofluoric acid, ammonium fluoride and nitric acid, an aqueous solution of hydrofluoric acid and ammonium hydrodifluoride, and an aqueous solution of hydrofluoric acid, ammonium hydrodifluoride and nitric acid. In addition, strong alkaline medicinal fluid containing sodium hydroxide or potassium hydroxide may be used for the etching solution although the alkaline medicinal fluid has a low etching speed.

As a result, although a tape is attached as the protection layer 90 (the first and second protection layers 91 and 92), a wet etching is performed on the entire outer surface and the cut faces (side end surface) of the first substrate 10, all other edges of the first substrate 10 except for the inner edge of the first substrate 10 overlapped with the second substrate 20, and all other edges of the second substrate 20 except for the inner edge of the second substrate 20 overlapped with the first substrate 10, and the outer surfaces of the wet-etched portions are etched thinly. Accordingly, fine scratches or cracks are removed from the cut faces and edges of the first and second substrates 10 and 20. Also, besides the cut faces and edges of the first and second substrates 10 and 20, the wet etching may be performed on the other exposed surface in a state where a tape is attached to the first substrate 10 as the protection layer 90, and the surface of the wet-etched portion may be etched thinly.

Furthermore, in this embodiment, when performing the etching step, it is impossible to erode the first wiring 5 without contacting with etching solution since the first wiring 6 of the protruding region 25 (the wiring portions 51 and 71) is covered with the first protection layer 91. In addition, since the gap 3 is sealed with the second protection layer 92, the etching solution cannot be injected into the gap 3. Accordingly, portions 52 and 72 of the wiring portions 51 and 71 positioned within the gap 3, and the end portion 42 (the second wiring 7) of the first electrode pattern 40 are not eroded.

Also, as shown in FIGS. 14(A) and 14(B), in the substrate mounting terminals 28, the circumferential portion of the substrate is slightly exposed from the first protection layer 91 and thus eroded and damaged. However, since most of the substrate mounting terminals 28 are covered with the first protection layer 91, there is no difficulty in mounting the plastic substrate 290.

As such, after performing the etching step ST40, the liquid crystal panel 1' is washed and dried. Then, the protection layer 90 (the first and second protection layers 91 and 92) is completely removed as shown in FIGS. 12(A) and 12(B). Thereafter, the driving IC 13 is mounted on the protruding region 25 of the single product liquid crystal panel 1' in the IC mounting step ST35 illustrated in FIG. 5(F).

Here, a portion of the protection layer 90 (the first and second protection layers 91 and 92) may be removed, and thus the remaining portion may remain as it is. For example, as illustrated in FIGS. 14(A) and 14(B), the first protection layer 91 is removed from the surfaces of the IC mounting terminals 26 and 27, the substrate mounting terminals 28, and alignment marks 55, and the peripheral regions thereof. Furthermore, the second protection layer 92 covering the gap 3 is entirely removed, but the first protection layer 91 covering the wiring portions 51 and 71 remains as it is. Then, in such a state, the driving IC 13 may be mounted on the protruding region 25 of the single product liquid crystal panel 1' in the IC mounting step ST35 illustrated in FIG. 5(F). According to the above construction, because the wiring portions 51 and 71 are covered with the first protection layer 91 thereafter, there is an advantage that the weatherability of the wiring portions 51 and 71 can be enhanced.

As above described, in this embodiment, the etching step ST40 is performed in a state of the single product panel 1', and thus fine scratches or cracks are removed from the entire outer surfaces, edges, and cut faces (side surfaces) of the first and second substrates 10 and 20. Accordingly, as shown in FIG. 10, although impact and stress are applied to a mobile phone to which the liquid crystal device 1 is mounted, fine scratches or creaks do not grow. Thus the liquid crystal panel 1' does not crack.

Also, in this embodiment, when performing the etching step ST40, the wiring portions 51 and 71 (the first wiring 6), IC mounting terminals 26 and 27, the substrate mounting terminals 28, and alignment marks 55 are covered with the first protection layer 91. Therefore, these wiring portions and terminals do not contact with the etching solution. Accordingly, the wiring portions 51 and 71(the first wiring 6), IC mounting terminals 26 and 27, the substrate mounting terminals 28, and alignment marks 55 are not eroded.

Further, since the gap 3 is blocked with the second protection layer 92, the etching solution is not injected into the gap 3. As a result, portions 52 and 72 of the wiring portions 51 and 71 positioned within the gap 3, and the end portion 42 (the second wiring 7) of the first electrode pattern 40 are not eroded.

Furthermore, since the etching step ST40 is performed in a state of the liquid crystal panel 1' in which a pair of substrates are bonded to each other, that is, in the final manufacturing state, scratches or cracks generated until that time can be removed collectively.

Moreover, since the wet etching used in the etching step ST40 is isotropically performed, it is suitable for removing scratches or cracks. Also, there is an advantage that a large amount of liquid crystal panels 1' can be collectively processed by. the wet etching.

Eighth Embodiment

Figure 15A:
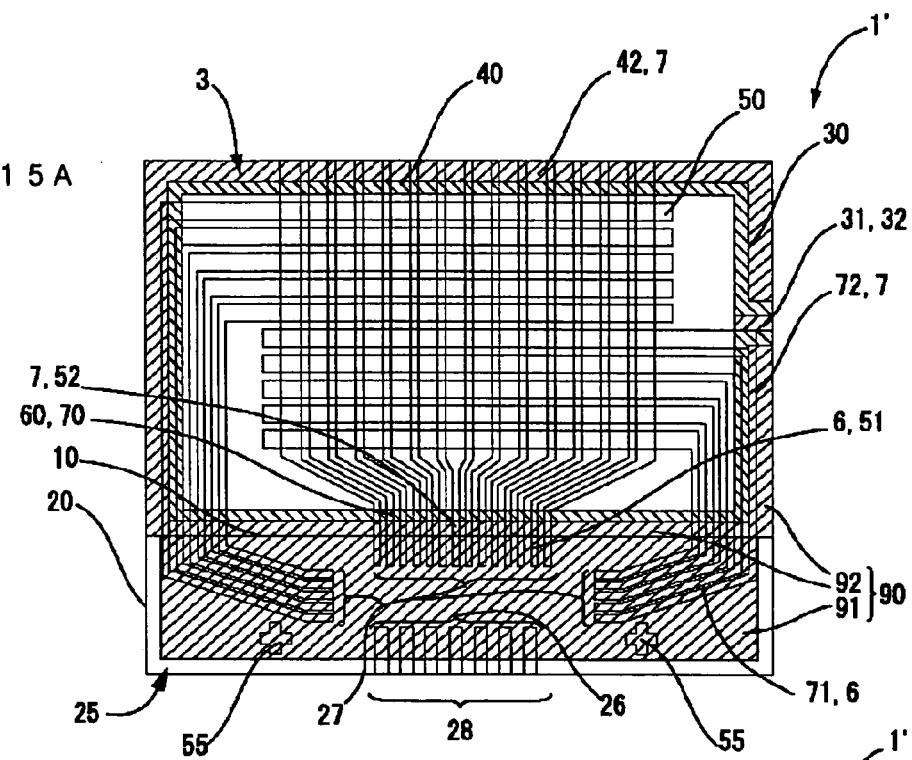
FIGS. 15(A) and 15(B) are a plan view and a cross-sectional view illustrating a state where a protection layer is formed when etching is performed on a liquid crystal panel in the course of the manufacturing process of an electro-optical device in accordance with a second embodiment of the present invention, respectively.
Figure 15B:
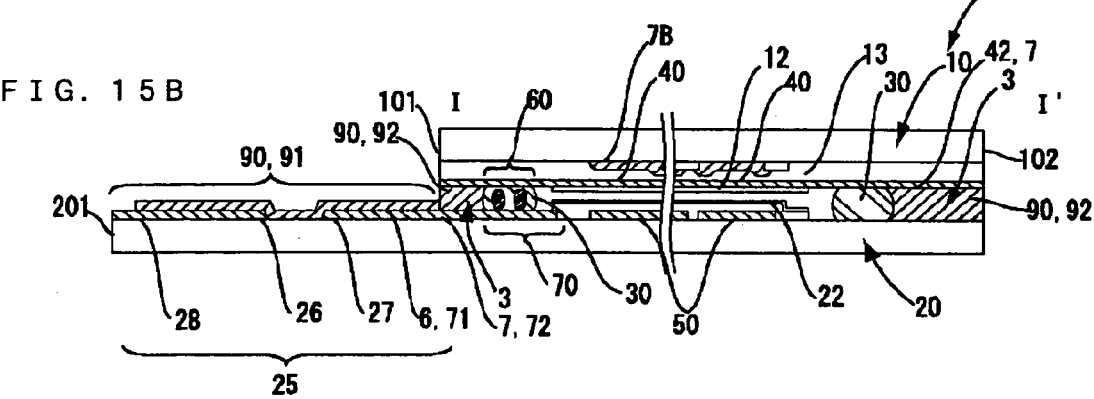
Figure 16A:
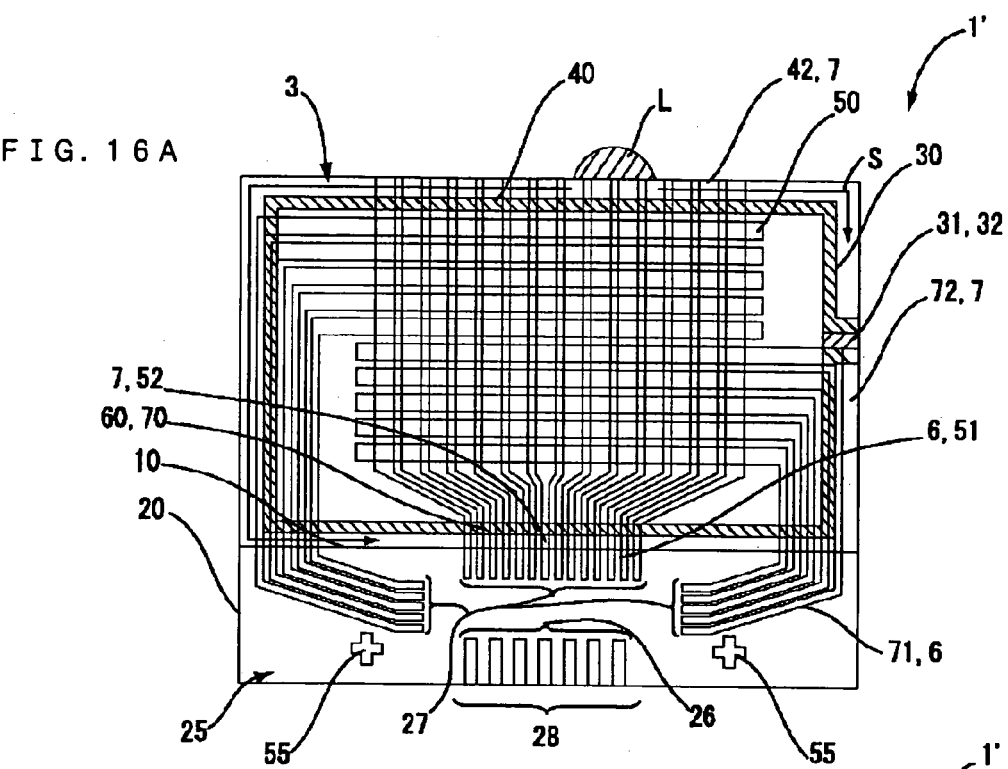
FIGS. 16(A) and 16(B) are a plan view and a cross-sectional view illustrating a method for forming a protection layer into a gap formed at the outside of a sealing material of the liquid crystal panel in the course of the manufacturing process of the electro-optical device in accordance with the second embodiment of the present invention, respectively.
Figure 16B:
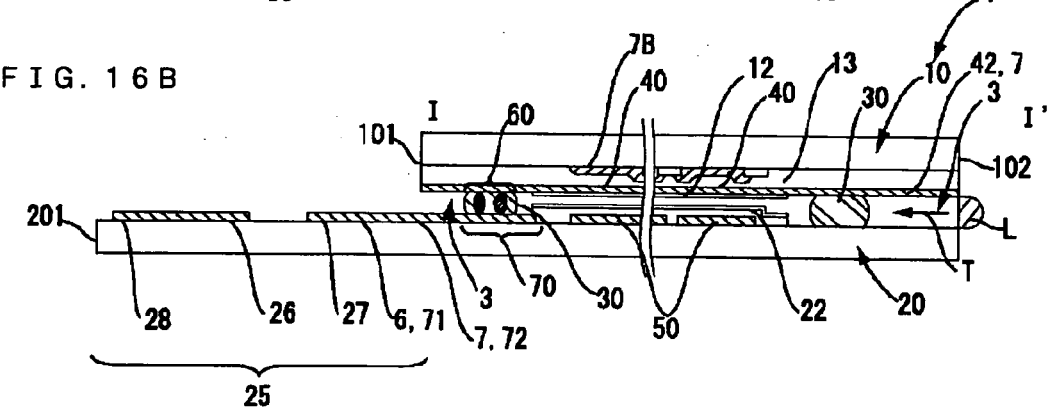
Figure 17A:
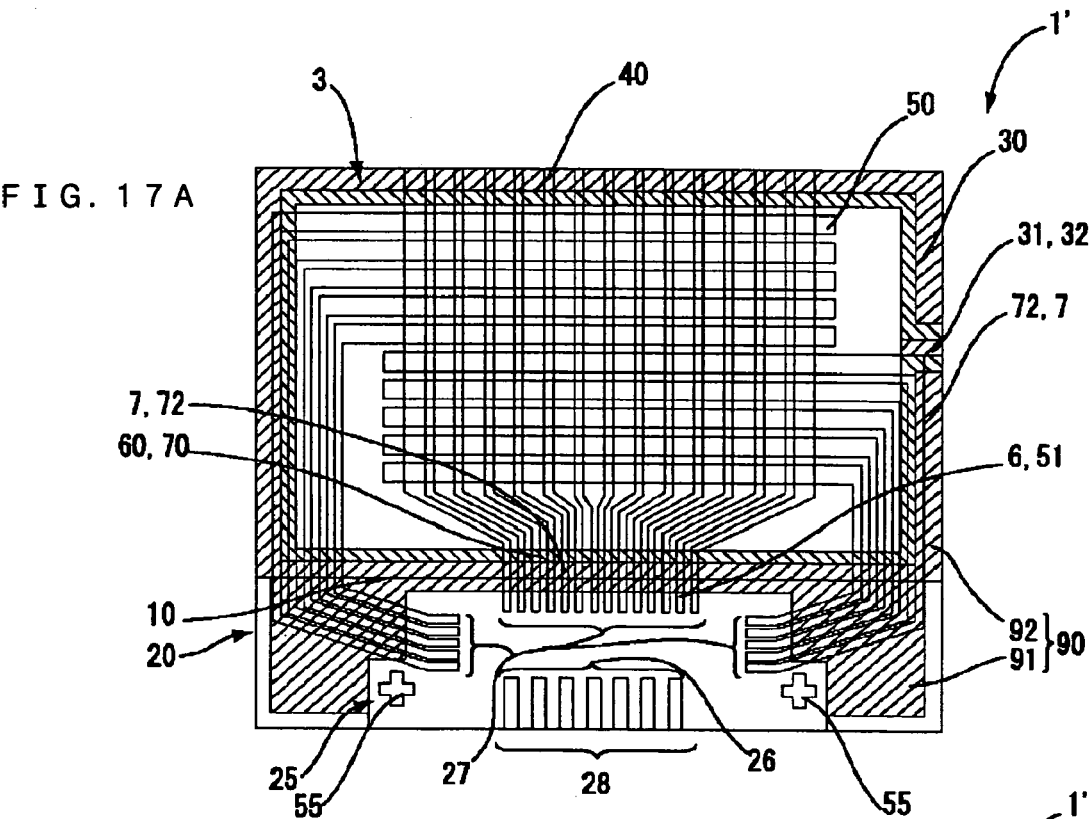
FIGS. 17(A) and 17(B) are a plan view and a cross-sectional view illustrating a state where a portion of the protection layer remains after etching is performed on the liquid crystal panel in the course of the manufacturing process of the electro-optical device in accordance with the second embodiment of the present invention, respectively.
Figure 17B:
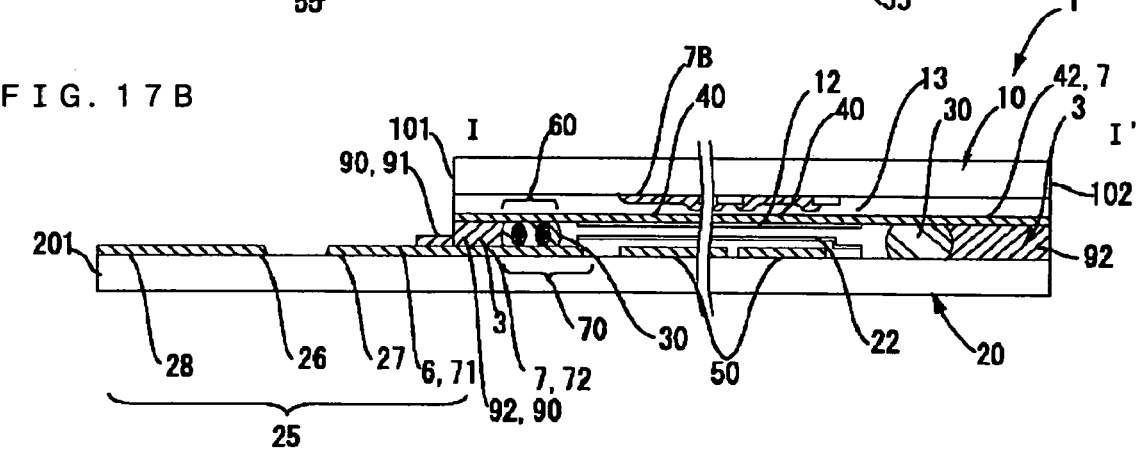

FIGS. 15(A) and 15(B) are a plan view and a cross-sectional view illustrating a state where a protection layer is formed when etching is performed on a liquid crystal panel in the course of the manufacturing processes of an electro-optical device according to the embodiment, respectively. FIGS. 16(A) and 16(B) are a plan view and a cross-sectional view illustrating a method for forming a protection layer within the gap, which is formed at the outside of the sealing material of the liquid crystal panel, in the course of the manufacturing process of an electro-optical device in accordance with the embodiment, respectively. FIGS. 17(A) and 17(B) are a plan view and a cross-sectional view illustrating a state where a portion of the protection layer remains after etching is performed in the course of the manufacturing process of an electro-optical device, respectively. Also, since the basic constructions of the eighth to eleventh embodiments to be described hereinafter are the same as that of the seventh embodiment, only characterized portions will be described with reference to FIG. 12 as well as FIGS. 15 to 17, and the explanation of common portions will be omitted.

Furthermore, in this embodiment, after the liquid crystal panel 1' is cut as a single product in the second break step ST34 illustrated in FIG. 4 and FIG. 5(E), in a state of the single product liquid crystal panel 1', a wet etching is performed on the cut faces and edges of the first and second substrates 10 and 20 to remove their outer surface before the driving IC 13 is mounted on the protruding region 25 of the single product liquid crystal panel 1' in the IC mounting step ST35 illustrated in FIG. 4 and FIG. 5(F). Accordingly, fine scratches or cracks are removed from the cut faces and edges of the substrates (etching step ST40). In addition, in the etching step ST40, not only the cut faces and edges of the first and second substrates 10 and 20 but also other exposed surfaces may be etched.

Moreover, in this embodiment, the liquid crystal panel 1' is cut as a single product in the second break step ST34. Then, as illustrated in FIGS. 15(A) and 15(B), before the etching step ST40 is performed, the wet etching is performed in a state where the protruding region 25 and the gap 3 are covered with the protection layer 90 (a hatched area at the upper right side with a narrow pitch). At this time, in the etching step ST40, not only the cut faces and edges of the first and second substrates 10 and 20 but also other exposed surfaces may be wet-etched.

In this embodiment, in view of the protection layer 90, a liquid material, in which a liquid photoresist or photoresist is diluted with a solvent, is applied on the slightly inward area from the edge of the second substrate 20 within the protruding region 25 of the second substrate 20 by a brush coating method, a screen printing method, an inkjet method, or an offset printing method, and then the liquid material is exposed and developed, thereby forming the first protection layer 91 composed of a resist layer. As a result, the first wiring 6 (wiring portions 51 and 71), the IC mounting terminals 26 and 27, the substrate mounting terminals 28, and the alignment marks 55 are covered with the first protection layer 91.

Also, a liquid material, in which resist or photoresist is diluted with a solvent, is applied into the gap 3, and then the liquid material is exposed and developed, thereby forming the second protection layer 92 composed of the resist layer. As a result, the second wiring 7 (portions 52 and 72 of the wiring portions 51 and 71, the end portion 42 of the first electrode pattern 40) positioned within the gap 3 is covered with the second protection layer 92.

Here, since the gap 3 between the first substrate 10 and the second substrate 20 is very narrow, it is very difficult or inconvenient to directly apply the resist into the gap 3 using any one of a brush coating method, a screen printing method, an inkjet method, or an offset printing method.

In this embodiment, as illustrated in FIGS. 16(A) and 16(B), at any time before or after forming the first protection layer 91, a liquid material L for forming a protection layer is applied in a spot shape on at least a portion of the entire circumference of the opened end of the gap 3, and then the liquid material L is spread to the inside and the entire circumference of the gap 3 by capillary action as illustrated in FIGS. 16(A) and 16(B) with arrow marks S and T. Then, the liquid material L is solidified to form the second protection layer 92. Accordingly, the second protection layer 92 can be formed in a state where the cut faces and all edges of the first and second substrates 10 and 20 are exposed.

Also, the etching step ST40 is performed in such a state. As a result, a wet etching is performed on the entire outer surface, the cut faces (side end surface), and all edges of the first substrate 10 even in a state where the protection layer 90 (first and second protection layers 91 and 92) is formed, and then the outer surface of the wet-etched portion is etched thinly. Accordingly, fine scratches or cracks are removed from the cut faces and edges of the first and second substrates 10 and 20.

In addition, in this embodiment, when the etching step is performed, the first wiring 6 (the wiring portions 51 and 71), the IC mounting terminals 26 and 27, the substrate mounting terminals 28, and the alignment marks 55 in the protruding region 25 are covered with the first protection layer 91, they do not contact with the etching solution and do not erode. Also, since the gap 3 is sealed with the second protection layer 92, the etching solution cannot be injected into the gap 3. Accordingly, the end portion 42 (the second wiring 7) of the first electrode pattern 40 and the portions 52 and 72 of the wiring portions 51 and 71 positioned within the gap 3 are not eroded.

After the etching step ST40 is performed as described above, the liquid crystal panel 1' is washed and dried. Thereafter, the protection layer 90 (the first and second protection layers 91 and 92) composed of resist is entirely removed by a detaching agent as illustrated in FIGS. 12(A) and 12(B). Then, the driving IC 13 is mounted on the protruding region 25 of the single product liquid crystal panel 1' in the IC mounting step ST35 illustrated in FIG. 5(F).

At this time, as illustrated in FIGS. 17(A) and 17(B), the first protection layer 91 is removed from the surfaces of the IC mounting terminals 26 and 27, the substrate mounting terminals 28, and the alignment marks 55, and the peripheral regions thereof, and a portion of the first protection layer 91 covering the wiring portions 51 and 71 remains as it is. In such a state, the driving IC 13 may be mounted on the protruding region 25 of the single product liquid crystal panel 1' in the IC mounting step ST35 illustrated in FIG. 5(F). According to the above construction, since the wiring portions 51 and 71 are covered with the first protection layer 91 thereafter, there is an advantage that the weatherability of the wiring portions 51 and 71 can be enhanced. In addition, the second protection layer 92 may remain within the gap 3 as it is.

Ninth Embodiment

Furthermore, in this embodiment, similar to the seventh embodiment, a liquid crystal panel 1' is first cut as a single product in the second break step ST34. Then, before the etching step ST40 is performed, a protruding region 25 and a gap 3 are covered with a protection layer 90 (a hatched area at the upper right side with a narrow pitch) as illustrated in FIGS. 15(A) and 15(B), and then the wet etching is performed.

In this embodiment, in the protection layer 90, paint and a liquid material, in which paint is diluted with a solvent, is applied on a slightly inward area from the edge of the second substrate 20 within the protruding region 25 of the second substrate 20 by a brush coating method, a screen printing method, an inkjet method, or an offset printing, and then the liquid material is dried and solidified to form the first protection layer 91 composed of the painted layer. As a result, the first wiring 6 (wiring portions 51 and 71), IC mounting terminals 26 and 27, the substrate mounting terminals 28, and the alignment mark 55 are covered with the first protection layer 91.

Also, after paint and a liquid material in which paint is diluted by a solvent are applied into the gap 3, they are dried and solidified, thereby forming the second protection layer 92 composed of the applied film. As a result, the second wiring 7 (portions 52 and 72 of the wiring portions 51 and 71, and the end portion 42 of the first electrode pattern 40) positioned within the gap 3 is covered with the second protection layer 92.

Since the gap 3 between the first substrate 10 and the second substrate 20 is very narrow, in this embodiment, similar to the second embodiment, as illustrated in FIGS. 17(A) and 17(B), paint (a liquid material L) for forming the protection layer is applied on at least a portion of the entire circumference of the opened end of the gap 3, and the liquid material L is spread to the inside and the entire circumference of the gap 3 by the capillary action of the liquid material L as illustrated in FIGS. 17(A) and 17(B) with arrows S and T, and thereafter, the liquid material L is solidified, thereby forming the second protection layer 92.

Then, the etching step ST40 is performed in this state. As a result, in the first substrate 10, even in a case where a protection layer 90 (first and second protection layers 91 and 92) is formed, a wet etching is performed on the entire outer surface, the cut faces (side end surface), and all other substrate edges, and thus the outer layers of the wet-etched portions are etched thinly. Accordingly, fine scratches or cracks are removed from the cut faces and edges of the first and second substrates 10 and 20. However, in this embodiment, since the first wiring 6 of the protruding region 25 (the wiring portions 51 and 71), the IC mounting terminals 26 and 27, the substrate mounting terminals 28, and the alignment marks 55 are covered with the first protection layer 91, they do not contact with the etching solution and do not erode. Also, since the gap 3 is sealed with the second protection layer 92, the etching solution cannot be injected into the gap 3. Accordingly, portions 52 and 72 of the wiring portions 51 and 71 positioned within the gap 3 and the end portion 42 (the second wiring 7) of the first electrode pattern 40 are not eroded.

After performing the etching step ST40 as described above, the liquid crystal panel 1' is washed and dried. Thereafter, the protection layer 90 (the first and second protection layers 91 and 92) formed by paint is entirely or partly removed by a detaching agent. Thereafter, the driving IC 13 is mounted on the protruding region 25 of the single product liquid crystal panel 1' in the IC mounting step ST35 illustrated in FIG. 5(F).

Tenth Embodiment

Figure 18A:
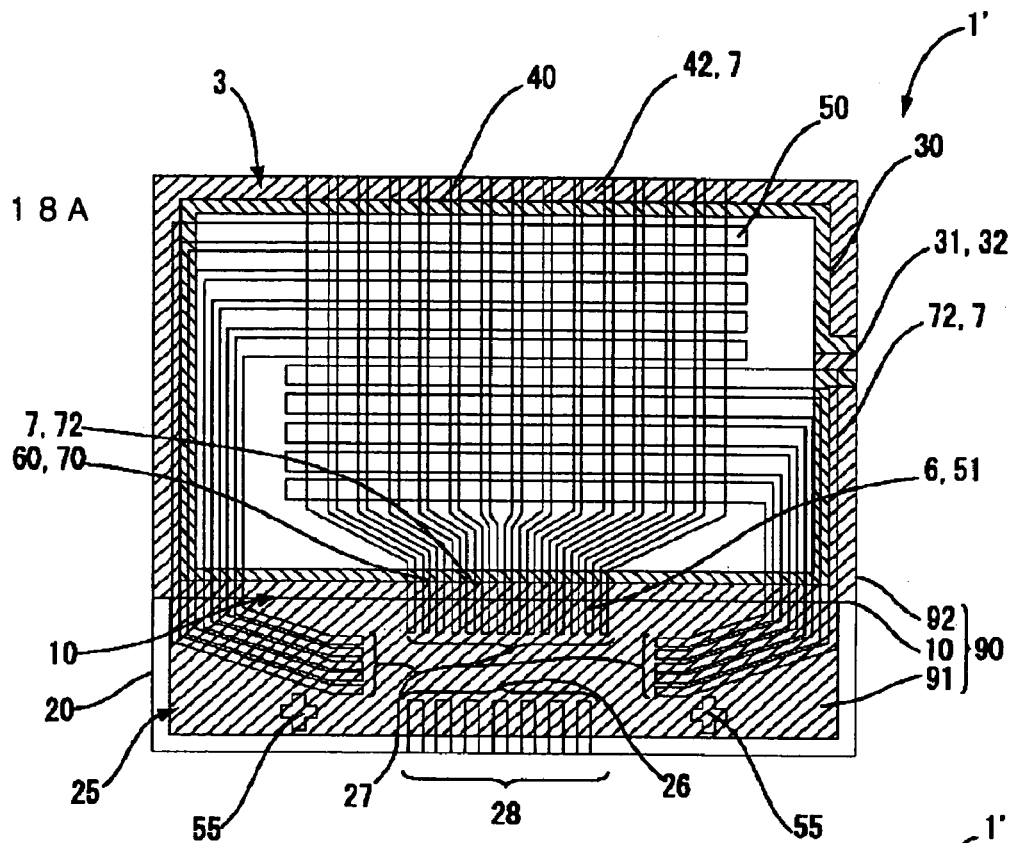
FIGS. 18(A) and 18(B) are a plan view and a cross-sectional view illustrating a state where a protection layer is formed when etching is performed on a liquid crystal panel in the course of the manufacturing process of an electro-optical device in accordance with a fourth embodiment of the present invention, respectively.
Figure 18B:
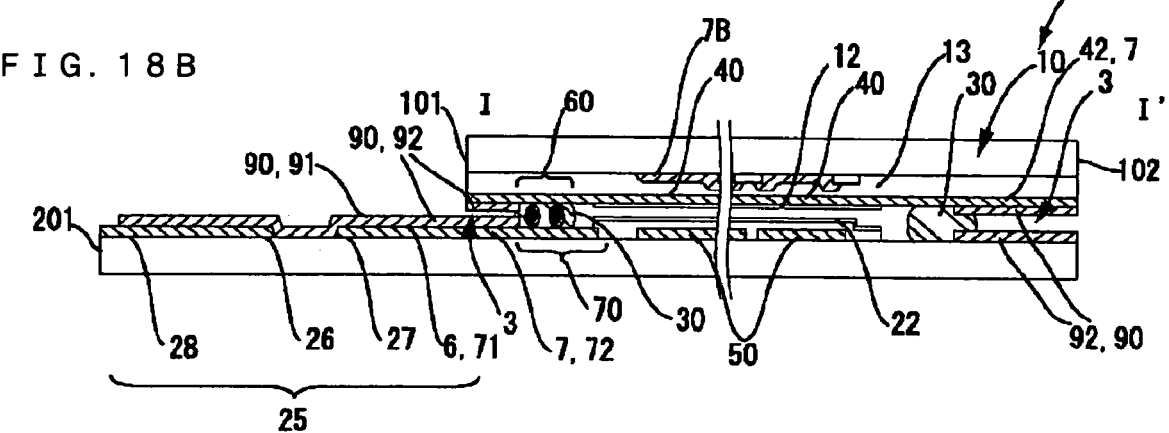

FIGS. 18(A) and 18(B) are a plan view and a cross-sectional view illustrating a state where a protection layer is formed when the etching step is performed on a liquid crystal panel in the course of the manufacturing process of an electro-optical device, respectively.

Also, in this embodiment, similar to the seventh embodiment, the liquid crystal panel 1' is cut as a single product in the second break step ST34. Then, before performing the etching step ST40, the protruding region 25 and the gap 3 are covered with a protection layer 90 (a hatched area at the upper right side with a narrow pitch) as illustrated in FIGS. 18(A) and 18(B), and then the wet etching is performed.

When forming the above protection layer 90, in this embodiment, it is formed within large-sized substrates 100 and 200 by an alignment layer forming and rubbing step ST15 and ST23.

That is, in the alignment layer formation and a rubbing step ST23, polyimide is applied and hardened on the entire surface of the second substrate 20, which is the large-sized substrate 200, by a spin coating method or various printing methods, and thereafter, the polyimide as an alignment layer 22 selectively remains within an area partitioned by a sealing material 30 through an oxygen plasma processing, and at this time, the polyimide film selectively remains on a slightly inward area from the edge of the second substrate 20 within the protruding region 25 of the second substrate 20, thereby forming the first protection layer 91. Also, the polyimide film remains so as to cover the second wiring 7 (the portions 52 and 72 of the wiring portions 51 and 71) formed in the gap 3, thereby forming the second protection layer 92.

Furthermore, in the alignment layer formation and rubbing step ST15, polyimide is applied and hardened on the entire surface of the first substrate 10 in a state of the large-sized substrate 100 by a spin coating method or various printing methods, and thereafter, the polyimide as an alignment layer 12 selectively remains within an area partitioned by the sealing material 30 through an oxygen plasma processing. At this time, the polyimide film selectively remains on the more outer periphery than the sealing material 30, thereby forming the second protection layer 92 for covering the second wiring 7 (the end portion 42 of the first electrode pattern 40) in the gap 3.

Then, the etching step ST40 is performed in this state. As a result, in the first substrate 10, even in a state where the protection layer 90 (the first and second protection layers 91 and 92) is formed, a wet etching is performed to the entire outer surface, the cut faces (side end surface), and all other substrate edges, and the outer layer of the wet-etched portion is etched thinly. Accordingly, fine scratches or cracks are removed from the cut faces and edges of the first and second substrates 10 and 20. However, in this embodiment, since the first wiring 6 of the protruding region 25 (the wiring portions 51 and 71), the IC mounting terminals 26 and 27, the substrate mounting terminals 28, and the alignment marks 55 are covered with the first protection layer 91, they do not contact with the etching solution and do not erode. Also, since the second protection layer 92 is formed in the gap 3, the portions 52 and 72 of the wiring portions 51 and 71 positioned within the gap 3, and the end portion 42 (the second wiring 7) of the first electrode pattern 40 are not eroded.

After performing the etching step ST40 as such, the liquid crystal panel 1' is washed and dried. Thereafter, the first protection layer 91 is entirely or partly removed by the oxygen plasma processing. Then, the driving IC 13 is mounted on the protruding region 25 of the single product liquid crystal panel 1' in the IC mounting step ST35 illustrated in FIG. 5(F).

As described above, in this embodiment, when forming the protection layer 90, polyimide, which is formed simultaneously with the polyimide (an organic insulating film) formed as the alignment layer 22 within regions partitioned by the sealing material 30, is used. Thus, it is unnecessary to add new processes for forming the protection layer 90, and an increase of the number of manufacturing processes can be minimized.

Moreover, when forming an overcoat layer 29 (an overcoat film formation step) at the second substrate 20 with an organic insulating film, resin constructing the overcoat layer 29 may be formed on the protruding region 25 as the protection layer 90. Also, since color filters 7R, 7G and 7B may be formed at the second substrate 20, resin constructing the color filters 7R, 7G and 7B may be formed on the protruding region 25 as the protection layer 90.

In addition, in a case where an inorganic insulating film is selectively formed within an area of the substrate partitioned by the sealing material 30, for example, when the overcoat layer 29 is formed by the inorganic insulating film such as a silicon oxide film, the inorganic insulating film concurrently formed with the inorganic insulating film such as the silicon oxide film may be used as the protection layer 90. In this case, when removing the inorganic insulating film later by etching, an etching solution having high etching selectivity to a material constructing the inorganic insulating film and the wiring may be used preferably.

Eleventh Embodiment

Figure 19A:
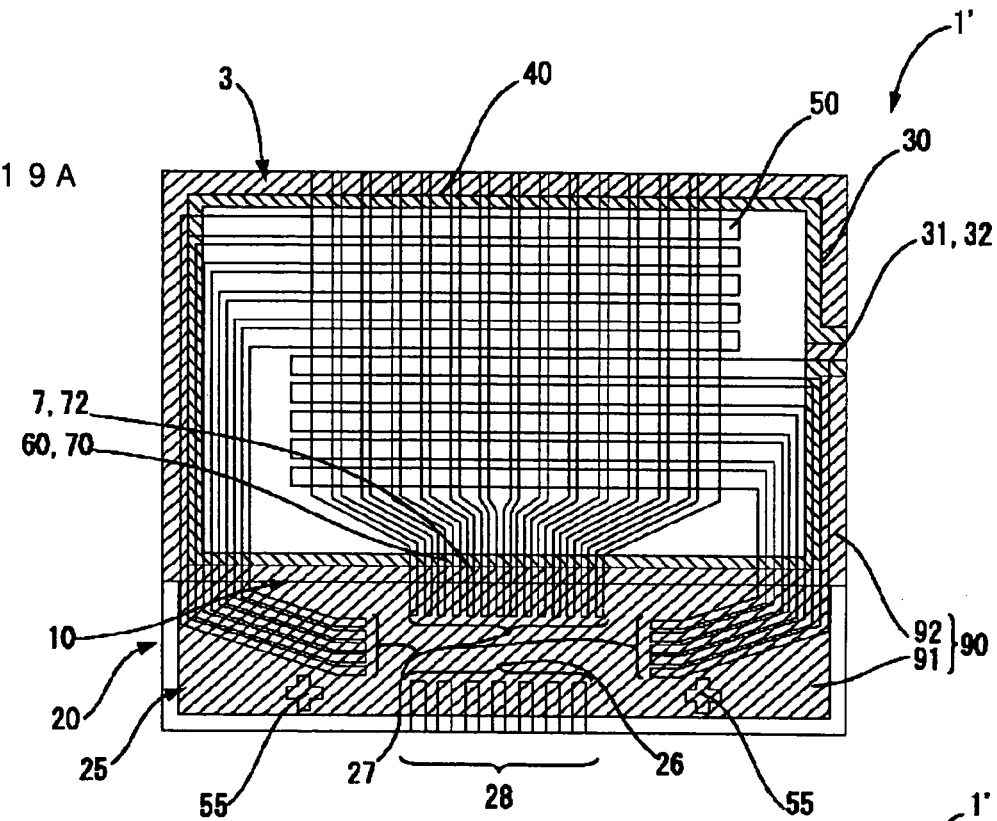
FIGS. 19(A) and 19(B) are a plan view and a cross-sectional view illustrating a state where a protection layer is formed when etching is performed on a liquid crystal panel in the course of the manufacturing process of an electro-optical device in accordance with a fifth embodiment of the present invention, respectively.
Figure 19B:
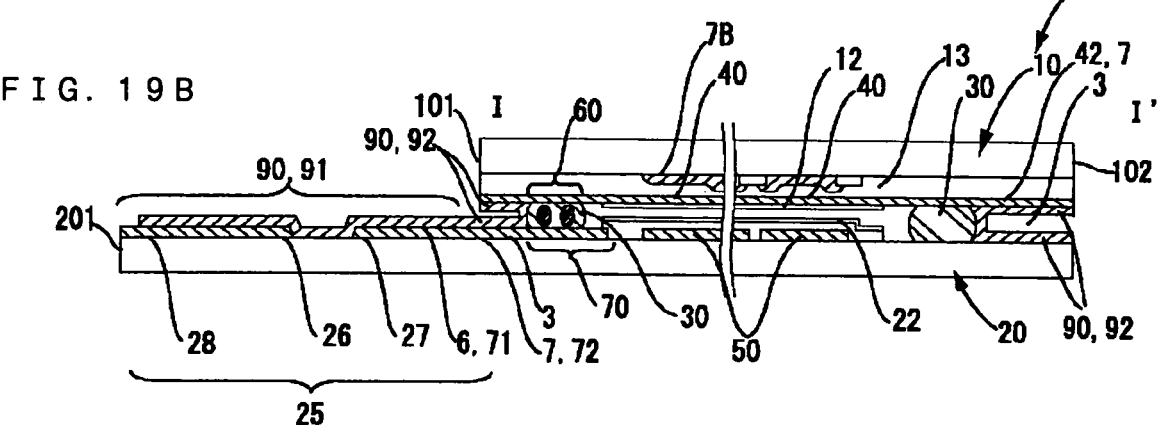

FIGS. 19(A) and 19(B) are a plan view and a cross-sectional view illustrating a state where a protection layer is formed when performing an etching step on a liquid crystal panel in the course of the manufacturing process of an electro-optical device, respectively.

Furthermore, in this embodiment, similar to the second embodiment, the liquid crystal panel 1' is cut as a single product in the second break step ST34. Then, before performing the etching step ST40, the protruding region 25 and the gap 3 are covered with a protection layer 90 (a hatched area at the upper right side with a narrow pitch) as illustrated in FIGS. 19(A) and 19(B), and then the wet etching is performed.

In this embodiment, as such a protection layer 90, a water repellent agent or a liquid material, in which the water repellent agent is dissolved with a solvent, is applied on a slightly inward region from the edge of the second substrate 20 within the protruding region 25 of the second substrate 20 by a brush coating method, a screen printing method, an inkjet method, or an offset printing method, and then it is dried, thereby forming the first protection layer 91 composed of a water repellent layer. As a result, the first wiring 6 (the wiring portions 51 and 71), the IC mounting terminals 26 and 27, the substrate mounting terminals 28, and the alignment marks 55 are covered with the first protection layer 91.

Also, a water repellent agent or a liquid material, in which the water repellent agent is dissolved with a solvent, is applied into the gap 3 and dried, thereby forming the second protection layer 92 composed the water repellent layer. As a result, the second wiring 7 (portions 52 and 72 of the wiring portions 51 and 71, an end portion 42 of the first electrode pattern 40) positioned within the gap 3 is covered with the second protection layer 92.

Since the gap 3 between the first substrate 10 and the second substrate 20 is very narrow, in this embodiment, similar to the second embodiment, as illustrated in FIGS. 16(A) and 16(B), the water repellent agent or the liquid material L, in which the water repellent agent is dissolved by a solvent, is applied on at least a portion of the entire circumference of the opened end of the gap 3, and the liquid material L is spread into the inside and the entire circumference of the gap 3 by the capillary action of the liquid material L as illustrated in FIGS. 16(A) and 16(B) with arrows S and T, thereby forming the second protection layer 92.

Furthermore, the etching step ST40 is performed in this state. As a result, in the first and second substrates 10 and 20, even in a case where the water repellent material is formed as a protection layer 90, etching is performed on the entire outer surface, edges, and cut faces (side end surface) with hydrophilic property. Accordingly, the outer layer of the etched portion is etched thinly. As a result, fine scratches or cracks are removed from the first and second substrates 10 and 20.

In contrast, since an area for forming the first wiring 6 (the wiring portions 51 and 71), the IC mounting terminals 26 and 27, the substrate mounting terminals 28, and the alignment marks 55 has a water repellent property, there is no erosion. Since the inside of the gap 3 has also the water repellent property, the portions 52 and 72 of the wiring portions 51 and 71 positioned within the gap 3, and the end portion 42 (the second wiring 7) of the first electrode pattern 40 are not eroded.

After performing the etching step ST40 as such, the liquid crystal panel 1' is washed and dried. Thereafter, the protection layer 90 (the first protection layer 91 and the second protection layer 92) composed of a water repellent agent may be entirely or partly removed, and then, the driving IC 13 is mounted on the protruding region 25 of the single product liquid crystal panel 1' in the IC mounting step ST35 illustrated in FIG. 5(F).

After performing the etching step ST40 as such, the liquid crystal panel 1' is washed and dried, and then the water repellent agent may be entirely or partly removed. However, since the water repellent agent is formed of the very thin layer, even if the protection layer 90 remains, there is no difficulty in mounting the driving IC 13 and the plastic substrate 290 on the protruding region 25 of the single product liquid crystal panel 1'.

Other Embodiments

Figure 20A:
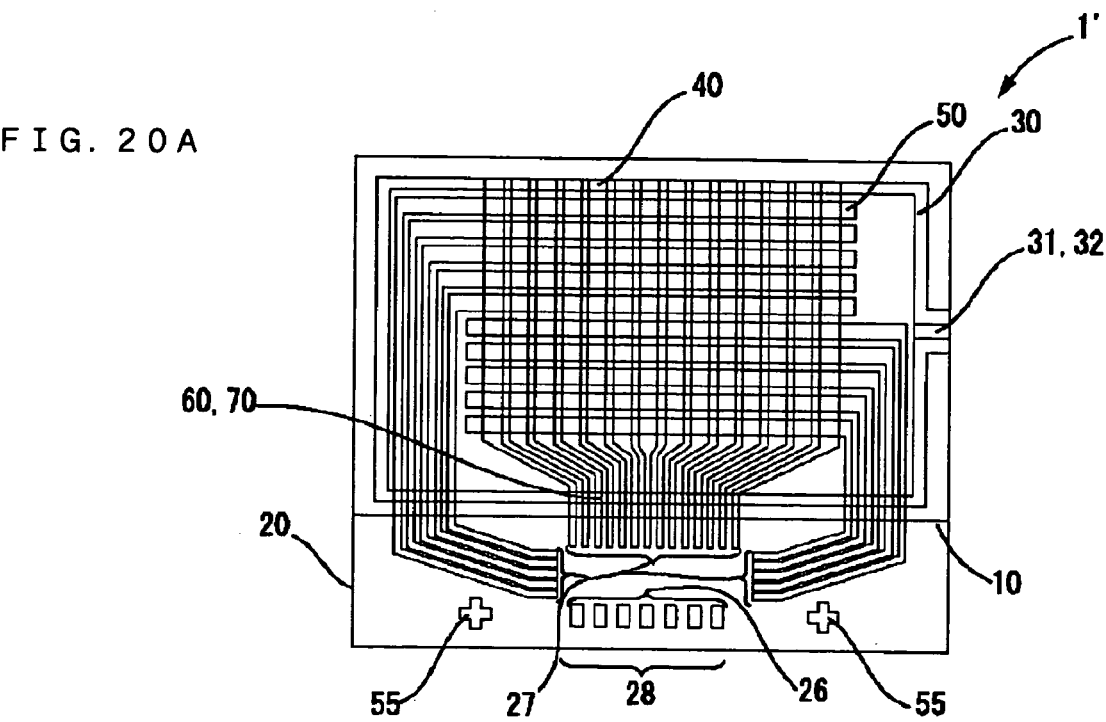
FIGS. 20(A) and 20(B) are a plan view and a cross-sectional view illustrating another liquid crystal panel in the course of the manufacturing process of the electro-optical device illustrated in FIG. 1, respectively.
Figure 20B:
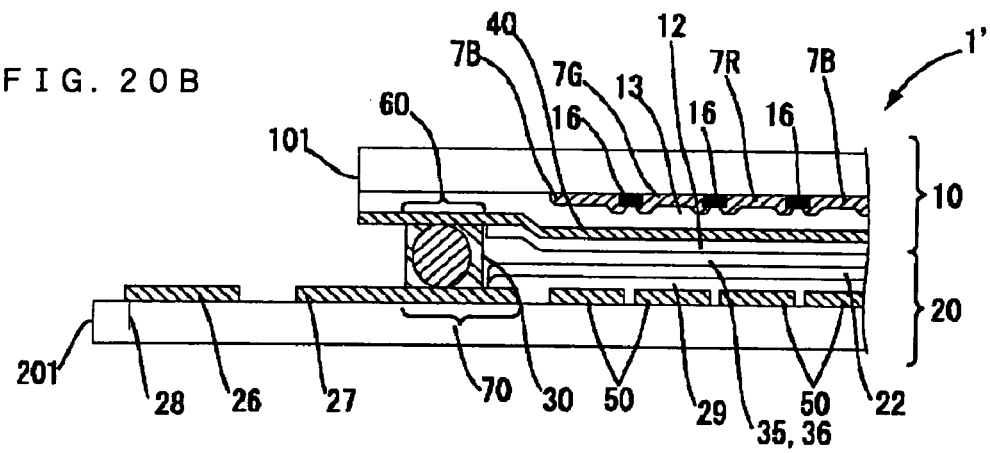
Figure 21A:
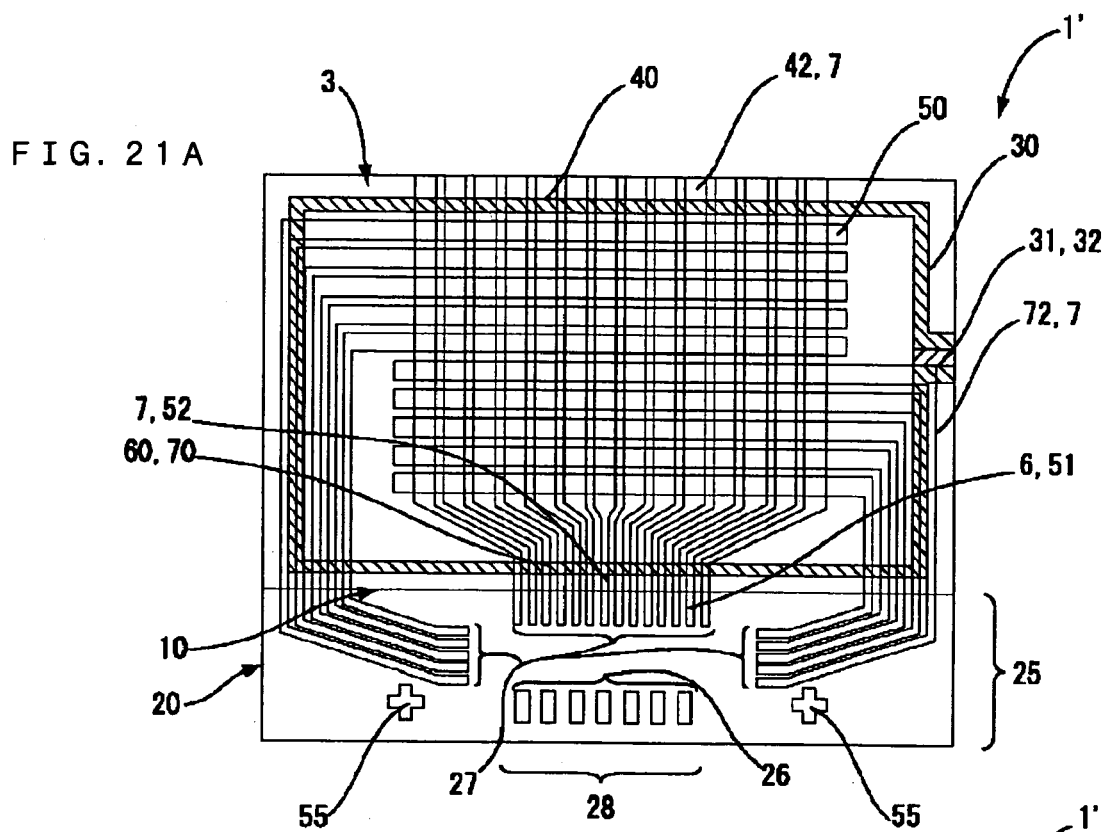
FIGS. 21(A) and 21(B) are a plan view and a cross-sectional view illustrating another liquid crystal panel in the course of the manufacturing process of an electro-optical device applying the present invention, respectively.
Figure 21B:
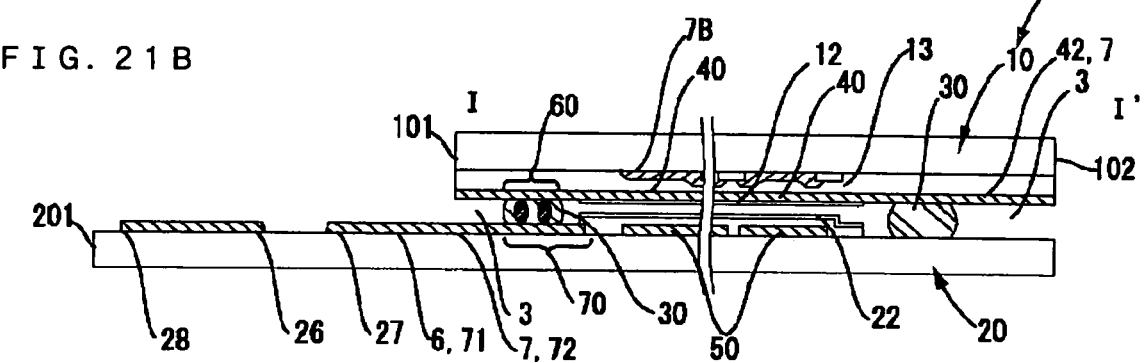

In the above embodiments, the substrate mounting terminals 28 positioned at the edge of the substrate are slightly exposed from the protection layer 90, thereby causing erosion and damage at the exposed area. As shown in FIGS. 20(A) and 20(B) and FIGS. 21 (A) and 22(B), the substrate mounting terminals 28 may be formed at a slightly inward portion avoiding the edge of the substrate.

Also, in the above embodiments, although the etching step ST40 is performed before the IC mounting step ST35, the etching step ST40 may be performed after the IC mounting step ST35. In such a case, since the wiring portions 51 and 71, and the substrate mounting terminals 28 are exposed, they are covered with the protection layer 90. In this case, since the etching is performed in a state where the driving IC 13 is already mounted, the etching step may be performed in a state where the driving IC 13 is covered with the protection layer 90 or in a state where the driving IC 13 is exposed. Although the etching is performed in the state that the driving IC 13 is exposed, a bump electrode and IC mounting terminals 26 and 27 of the driving IC 13 are covered with an anisotropic conductive layer, there is no concern for erosion or damage due to the etching solution. On the contrary, when the etching step is performed in a state that the driving IC 13 is exposed, the substrate edge and cut face (side end surface) of the IC chip are etched. Thus, when the IC chip is cut from a silicon wafer, fine scratches or cracks can be removed. Further, in the above embodiments, although a wet etching is employed for the etching step ST40, a dry etching may be used.

Furthermore, as for the timing for forming the protection layer 90, although there are four patterns as described hereinafter, the protection layer 90 may be formed by any one of the above patterns.

That is, in the first pattern, in view of the protection layer 90, the first protection layer 91 corresponding to the protruding region 25 and the second protection layer 92 corresponding to the gap 3 are formed in a state of the liquid crystal panel 1' in which the first substrate 10 is bonded to the second substrate 20.

In the second pattern, in view of the protection layer 90, the first protection layer 91 corresponding to the protruding region 25 and the second protection layer 92 corresponding to the gap 3 are formed in a state of the large-sized substrate before the first substrate 10 is bonded to the second substrate 20.

In the third pattern, in view of the protection layer 90, the first protection layer 91 corresponding to the protruding region 25 is formed in a state of the liquid crystal panel 1' in which the first substrate 10 is attached to the second substrate 20 and the second protection layer 92 corresponding to the gap 3 are formed with the large-sized substrate before the first substrate 10 is bonded to the second substrate 20.

In the fourth pattern, in view of the protection layer 90, the first protection layer 91 corresponding to the protruding region 25 is formed in a state of the large-sized substrate before the first substrate 10 is bonded to the second substrate 20, and the second protection layer 92 corresponding to the gap 3 is formed in a state of the liquid crystal panel 1' in which the first substrate 10 is bonded to the second substrate 20.

Also, in the above aspects, although various examples using a tape, resist, paint, a water repellent material, and an alignment layer are explained for the first and second protection layers 91 and 92, other materials can be used for each of the first and second protection layers 91 and 92.

Construction of Electro-optical Device Capable of Applying the Present Invention Although in all of the above embodiments, the present invention is applied to an electro-optical device comprising a passive matrix liquid crystal device, the present invention can be applied to any electro-optical device, which will be explained hereinafter with reference to FIGS. 22 to 24, because a flexible substrate is connected to a rigid substrate holding an electro-optical material to input a signal.

Figure 22:
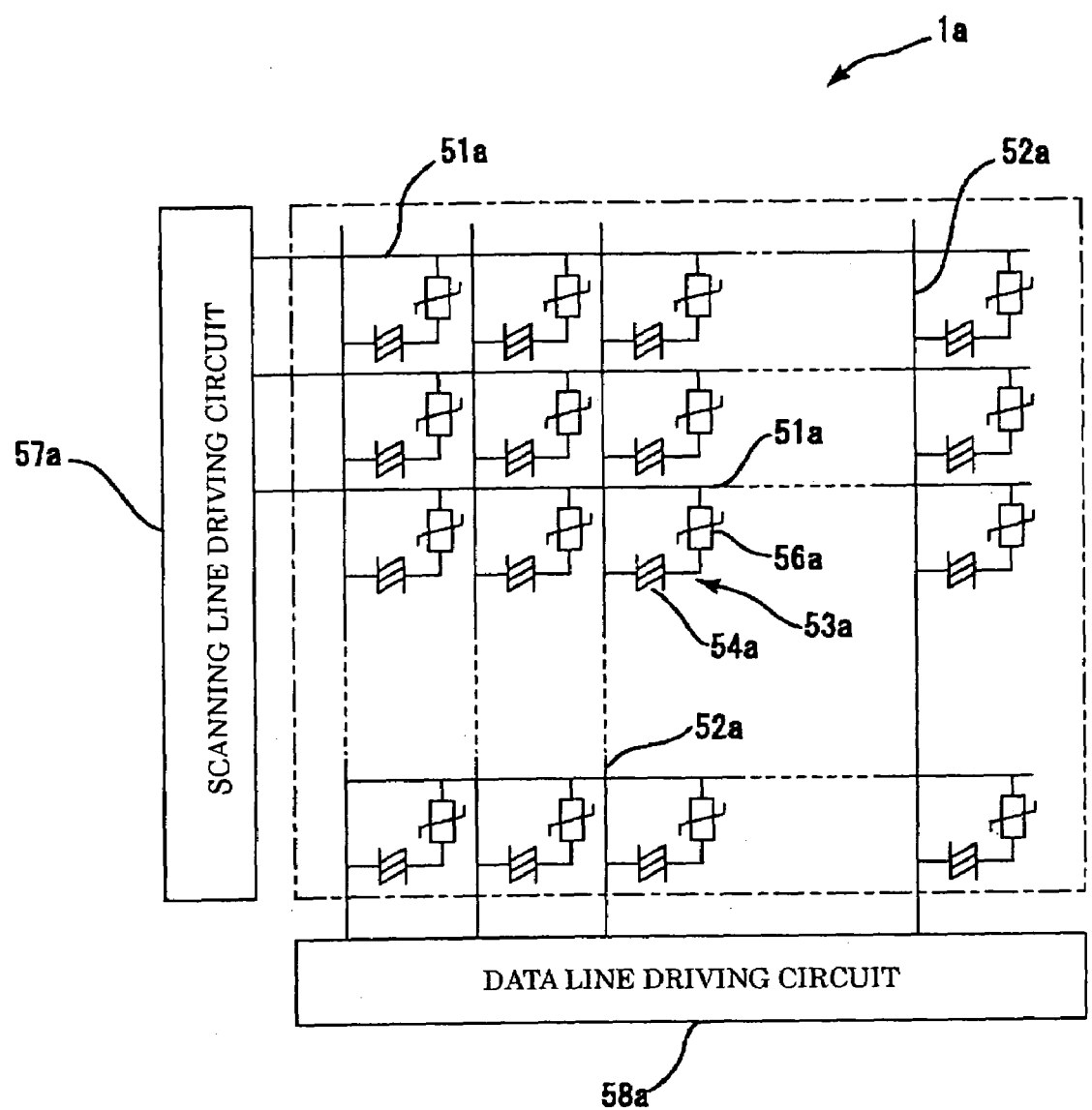
FIG. 22 is a block diagram schematically illustrating the construction of an electro-optical device including an active matrix liquid crystal device in which non-linear elements are used as pixel switching elements.

FIG. 22 is a block diagram schematically illustrating the construction of an electro-optical device comprising an active matrix liquid crystal device using a non-linear device as a pixel switching device. FIG. 23 is a block diagram schematically illustrating the construction of an electro-optical device comprising an active matrix liquid crystal device using a thin film transistor (TFT) as a pixel switching device. FIG. 24 is a block diagram illustrating the construction of an active matrix electro-optical device having an electroluminescent device using a charge implantation type organic film as an electro-optical material.

As shown in FIG. 22, in an electro-optical device 1a comprising an active matrix liquid crystal device using a non-linear device as a pixel switching device, scanning lines 51a as a plurality of wiring lines are formed in a row direction, and a plurality of data lines 52a are formed in a column direction. A pixel 53a is formed at a position corresponding to each intersection point of the scanning line 51*a* and the data line 52*a*, and a liquid crystal layer 54*a* and a TFD device 56*a* (non-linear device) for switching the pixel are connected in series to each other at the pixel 53*a*. Each scanning line 51*a* is driven by a scanning line driving circuit 57*a*, and each data line 52*a* is driven by a data line driving circuit 58*a*.

Even in the electro-optical device 1*a* constructed as above, a COG mounting structure in which a pair of glass substrates and the like are bonded by a sealing material while they face each other, and a driving IC is mounted on at least one of the substrates. The structure for connecting a flexible substrate having a driving IC mounted by COF to a glass substrate is employed. Thus, the present invention is preferably applied to the above electro-optical device.

As shown in FIG. 23, in the electro-optical device 1*b* comprising an active matrix liquid crystal device using TFTs as pixel switching elements, a pixel terminal 9*a* and a pixel switching TFT 30*b* for controlling the pixel terminal 9*a* are formed in each of the plurality of pixels formed in a matrix shape, respectively, and a data line 6*b* for supplying pixel signals is electrically connected to a source of the corresponding pixel switching TFT 30*b*. A pixel signal written to the data line 6*b* is supplied from a data line driving circuit 2*b*. Also, a scanning line 31*b* is electrically connected to a gate of the TFT 30*b*, and a scanning signal is supplied from a scanning line driving circuit 3*b* to the scanning line 31*b* in pulses in a predetermined timing. The pixel terminal 9*a* is electrically connected to a drain of the TFT 30*b*, and the TFT 30*b* as a switching device is kept turned on during a predetermined period, so that pixel signals supplied from the data line 6*b* are written to each pixel in a predetermined timing. As such, a predetermined level of pixel signal written to the liquid crystal through the pixel terminal 9*a* is held between a counter electrode formed at a counter substrate and the pixel terminal during a predetermined period of time.

Here, in order to prevent the held pixel signal from leaking, a storage capacitor 70*b* (capacitor) may be added in parallel to the liquid crystal capacitor formed between the pixel terminal 9*a* and a counter electrode. By the capacitor 70*b*, the voltage of the pixel terminal 9*a* is held, for example, during the time longer than the time the source voltage is applied by three-digit number. In this way, a holding characteristic of charge is improved, and thus an electro-optical device allowing high contrast display can be realized. Also, as a method for forming the capacitor 70*b*, any one of a case where it is formed between capacitor lines 32*b*, as wiring for forming the capacitor, or a case where it is formed between the scanning lines 31*b* of the preceding part may be preferable.

In the electro-optical device 1*b* constructed as above, a structure is adopted in which a pair of glass substrates and the like are attached by a sealing material while they face each other, and a flexible substrate is attached to a glass substrate. The present invention is preferably applied to the electro-optical device 1*b*.

Figure 24:
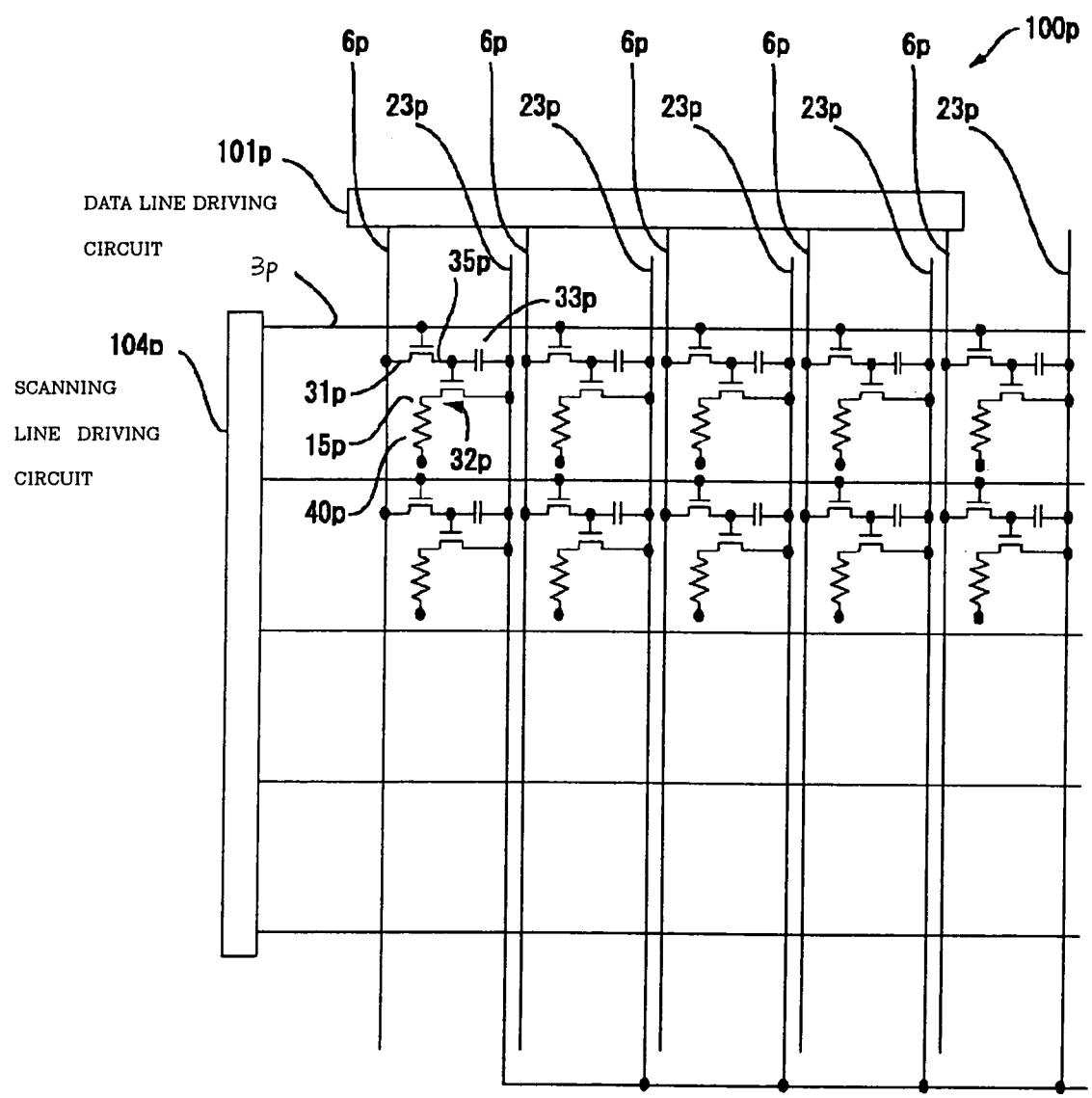
FIG. 24 is a block diagram illustrating an active matrix display device having electroluminescence elements in which a charge implantation type organic thin film is used as an electro-optical material.

As shown in FIG. 24, an active matrix electro-optical device having an electroluminescent device using a charge implantation type organic film is an active matrix type display device for controlling a light-emitting device with TFTs, such as EL (electroluminescent) device or LED (light-emitting diode) device, which emits light by flowing driving current to an organic semiconductor film. Since the light-emitting devices used in the display device of this type are all self-emitting devices, there is no need of a backlight, and there is an advantage that the dependence on viewing angel is little.

An electro-optical device 100*p* illustrated here comprises a plurality of scanning lines 3*p*, a plurality of data lines 6*p* extending in a direction which intersects the extending direction of the scanning lines 3*p*, a plurality common electric supply lines 23*p* parallel to the data lines 6*p*, and a pixel 15*p* corresponding to the intersection point of the data line 6*p* and the scanning line 3*p*. The data line 6*p* is connected to a data line driving circuit 101*p* comprising a shift register, a level shifter, a video line, and an analog switch. The scanning line 3*p* is connected to a scanning line driving circuit 104*p* comprising a shift register and a level shifter.

Also, the respective pixels 15*p* comprise a first TFT 31*p* in which a scanning signal is supplied to a gate electrode through the scanning line 3*p*, a storage capacitor 33*p* for holding a pixel signal supplied from the data line 6*p* through the first TFT 31*b*, a second TFT 32*p* in which a pixel signal held by the storage capacitor 33*p* is supplied to the gate electrode, and a light-emitting device 40*p* in which driving current flows from the common electric supply line 23*p* when it is electrically connected to the common electric supply line 23*p* through the second TFT 32*p*.

In the light-emitting diode 40*p*, a counter electrode comprising a hole injection layer and an organic semiconductor film as an organic electroluminescent material layer, a metal film made of materials such as aluminum containing lithium and calcium is laminated at the upper side of the pixel electrode, the counter electrode (not shown) is formed over a plurality of pixels 15*p* beyond the data line 6*p*.

In the electro-optical device 1*p* constructed as above, a structure is adopted in which a protection substrate made of glass is attached by a sealing material to a device substrate composed of glass substrate in which a light-emitting device is formed, and a flexible substrate is attached to the device substrate. Thus, the present invention is preferably applied to the electro-optical device.

Also, besides the above embodiments, the present invention can be applied to various electro-optical devices such as a small-sized TV using a plasma display device, a FED (Field Emission Display) device, an LED (light emitting diode) display device, an electrophoresis display device, a thin cathode ray tube, a liquid crystal shutter and the like; a device using a digital micro mirror device (DMD), and the like.

Embodiment of an Electronic Apparatus

Figure 25:
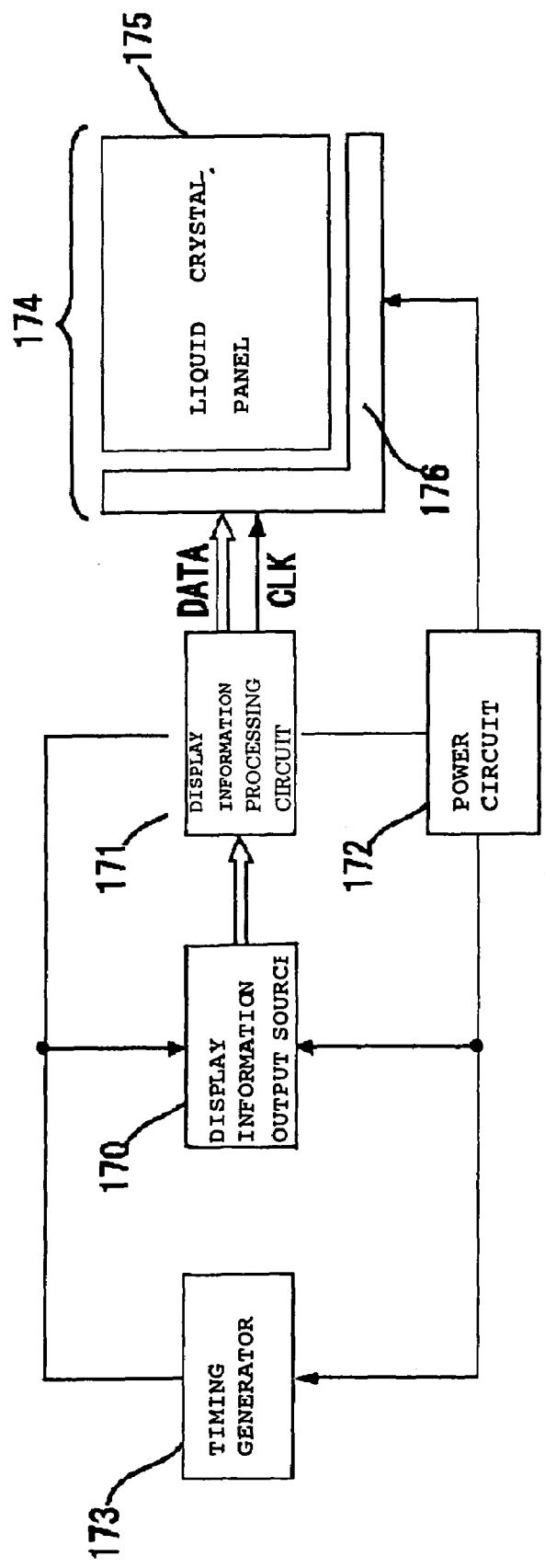
FIG. 25 is a block diagram illustrating structures of various electronic apparatuses using an electro-optical device according to the present invention.

FIG. 25 shows an embodiment of a case that an electro-optical device according to the present invention is used as a display device of various electronic apparatuses. An electronic apparatus illustrated here has a display information output source 170, a display information processing circuit 171, a power circuit 172, a timing generator 173, and an electro-optical device 174. Also, the electro-optical device 174 has a display panel 175 and a driving circuit 176. The aforementioned electro-optical device can be used as the electro-optical device 174.

The display information output source 170 has memories such as a ROM (Read Only Memory) and a RAM (Random Access Memory), a storage unit such as various disks, and a resonance circuit for tuning and outputting digital image signals. The display information output source 170 supplies display information such as a predetermined format of image signals to the display information processing circuit 171 on the basis of various clock signals generated by a timing generator 173.

The display information processing circuit 171 has various known circuits such as a serial/parallel conversion circuit, an amplification/inversion circuit, a rotation circuit, a gamma correction circuit, a clamp circuit, and the like. The display information circuit 171 processes the input display information and supplies the image signal to the driving circuit 176 together with clock signals CLK. A scanning line driving circuit, a data line driving circuit, a test circuit, or the like is generally called the driving circuit 176. Also, the power circuit 172 supplies a predetermined voltage to each component.

Figure 26A:
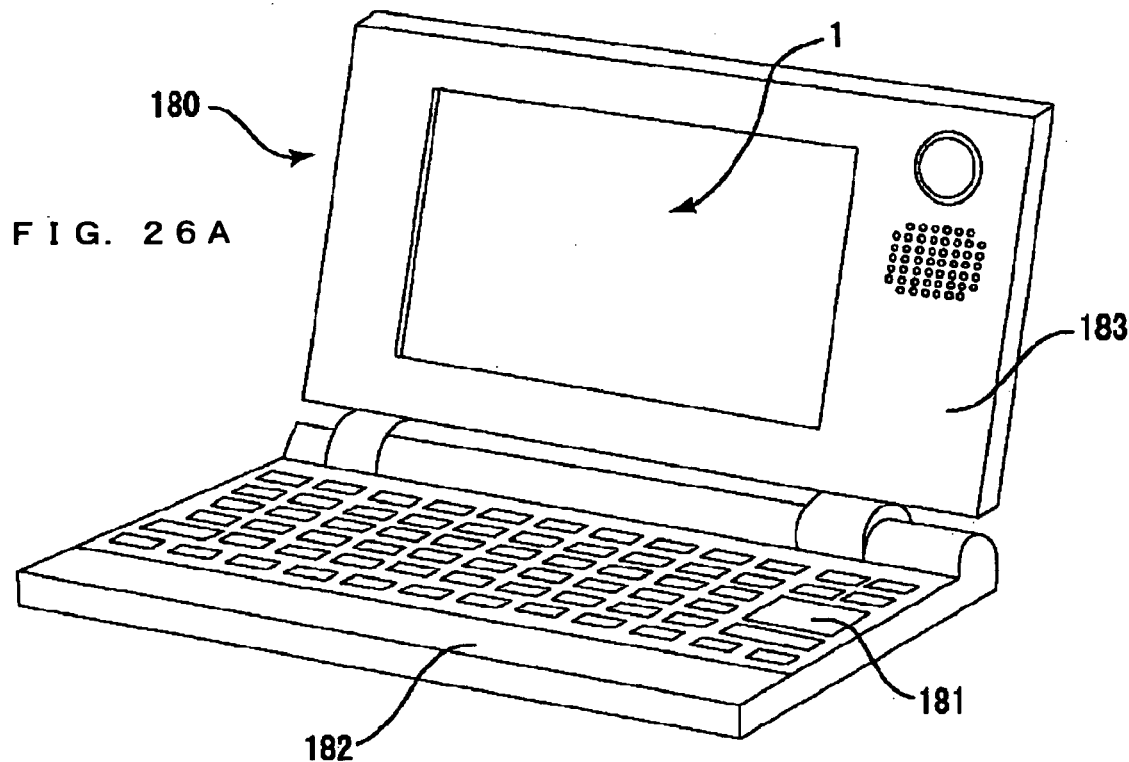
FIGS. 26(A) and 26(B) are diagrams illustrating a mobile type personal computer and a mobile phone as an embodiment of electronic apparatuses using an electro-optical device according to the present invention.

FIG. 26(A) shows a mobile type personal computer as an embodiment of an electronic apparatus according to the present invention. The personal computer illustrated in this embodiment has a body 182 having a keyboard 181 and a liquid crystal display unit 183. The liquid crystal display unit 183 includes the aforementioned electro-optical device 1 and a liquid crystal panel 1' and the like.

Figure 26B:
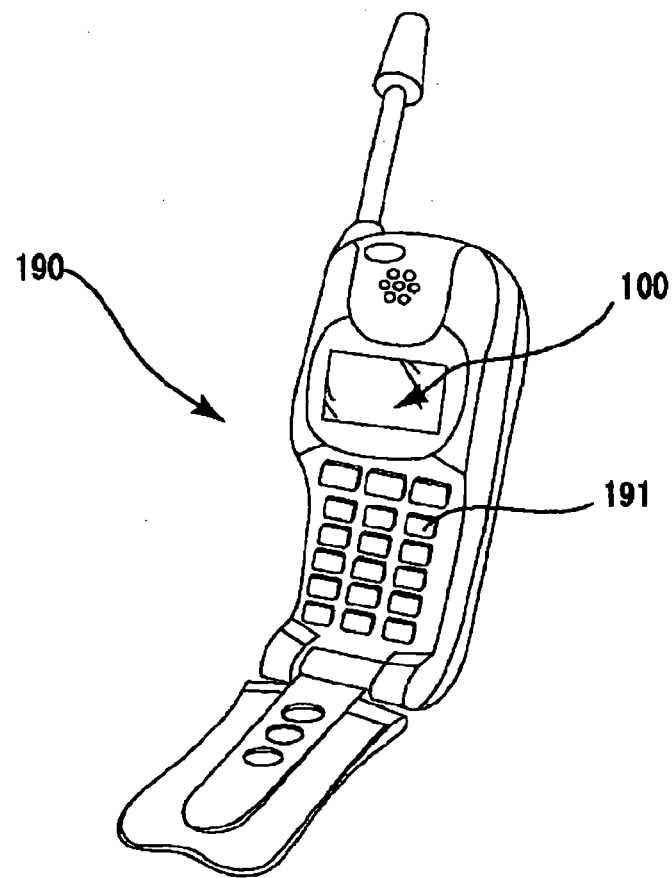

FIG. 26(B) shows a mobile phone as another embodiment of an electronic apparatus in accordance with the present invention. The mobile phone 190 illustrated in FIG. 26(B) has plural operation buttons 191 and the aforementioned electro-optical device 1.

The entire disclosure of Japanese Patent Application Nos. 2002-358377 filed Dec. 10, 2002 and 2002-358378 filed Dec. 10, 2002 are incorporated by reference herein.

What is claimed is:

1. A method for manufacturing an electro-optical device including: a first substrate; a second substrate bonded opposite the first substrate by a sealing material provided therebetween, the second substrate including a protruding region; wiring lines and terminals located within the protruding region; and wiring positioned within a gap between the first substrate and the second substrate, the method comprising:

covering all of the wiring lines and terminals formed within the protruding region of the second substrate with a protective layer, at least the edges and cut faces of the first substrate and the second substrate being free of the protection layer; and etching at least edges and cut faces of the first substrate and the second substrate to remove scratches from the first substrate and the second substrate while the wiring lines and terminals are in a covered state and at least the edges and cut faces of the first substrate and the second substrate are free of the protection layer.

2. The method according to claim 1, wherein electronic component mounting terminals, on which an electronic component is mounted, are formed on the protruding region, and wherein before the electronic component is mounted on the electronic component mounting terminals, the etching step is performed in a state where the surfaces of the electronic component mounting terminals are covered with the protection layer.

3. The method according to claim 1,
wherein the protection layer is removed after the etching step.

4. The method according to claim 1,
wherein a portion of the protection layer is removed, and the rest of the protection layer remains after the etching step.

5. The method according to claim 1,
wherein the etching includes wet etching.

6. The method according to claim 1,
wherein an organic insulating film, which is formed simultaneously with the organic insulating film formed in regions partitioned by the sealing material in the substrate, is used as all or a portion of the protection layer.

7. The method according to claim 1,
wherein an inorganic insulating film, which is formed simultaneously with the inorganic insulating film formed in regions partitioned by the sealing material in the substrates, is used as all or a portion of the protection layer.

8. The method according to claim 1, wherein the wiring positioned within the gap between the first substrate and second substrate is in a covered state during the step of etching.

9. The method according to claim 2,
wherein substrate mounting terminals, on which a plastic substrate is mounted, are formed on the protruding region,
wherein the electronic component mounting terminals are IC mounting terminals to which an IC, serving as an electronic component, is connected, and
wherein the etching step is performed on the IC mounting terminals and the substrate mounting terminals before the IC and the plastic substrate are connected to the IC mounting terminals and the substrate mounting terminals, respectively.

10. The method according to claim 2,
wherein alignment marks, which are used when the electronic component is mounted on the electronic component mounting terminals, are formed on the protruding region, and
wherein when the etching step is performed, the surfaces of the alignment marks are covered with the protection layer.

11. The method according to claim 2,
wherein after the etching step, a portion of the protection layer formed on at least the surfaces of the electronic component mounting terminals and the substrate mounting terminals is removed.

12. The method according to claim 9,
wherein alignment marks, which are used when the electronic component is mounted on the electronic component mounting terminals, are formed on the protruding region, and
wherein when the etching step is performed, the surfaces of the alignment marks are covered with the protection layer.

13. The method according to claim 9,
wherein after the etching step, a portion of the protection layer formed on at least the surfaces of the electronic component mounting terminals and the substrate mounting terminals is removed.

14. The method according to claim 1,
wherein the wiring lines are formed in the gap at an outer periphery of the sealing material.

15. The method according to claim 14,
wherein one of the first substrate and the second substrate comprises the protruding region protruding from an edge of the other.

16. The method according to claim 15,
wherein before the first substrate is bonded to the second substrate, the first protection layer is formed on the protruding region, and the second protection layer is formed in the gap.

17. The method according to claim 15,
wherein the first protection layer is formed on the protruding region in the state of the electro-optical panel where the first substrate and the second substrate are bonded to each other, and the second protection layer is formed in the gap before the first substrate is bonded to the second substrate.

18. The method according to claim 15,
wherein the protection layer comprises a first protection layer and a second protection layer,
wherein the first protection layer is formed on the protruding region and the second protection layer is formed in the gap in the state of the electro-optical panel where the first substrate and the second substrate are bonded to each other.

19. The method according to claim 18,
wherein when the second protection layer is formed in the gap in said state of the electro-optical panel, a liquid material for forming the protection layer is applied on at least a portion of the opened end of the gap, and the liquid material between the substrates is spread into the gap by capillary action.

20. The method according to claim 15,
wherein the first protection layer is formed on the protruding region before the first substrate is bonded to the second substrate, and the second protection layer is formed in the gap in the state of the electro-optical panel where the first substrate and the second substrate are bonded to each other.

21. The method according to claim 20,
wherein when the second protection layer is formed in the gap in said state of the electro-optical panel, a liquid material for forming the protection layer is applied on at least a portion of the opened end of the gap, and the liquid material between the substrates is spread into the gap by capillary action.

22. The method according to claim 15,
wherein IC mounting terminals, on which an IC chip is mounted, are formed on the protruding region,
wherein the etching step is performed before the IC chip is mounted on the IC mounting terminals, and the IC mounting terminals are also covered with the protection layer when the etching step is performed, and
wherein at least a portion of the protection layer, which covers the IC mounting terminals, is removed after the etching step.

23. The method according to claim 22,
wherein the IC mounting terminals, on which the IC chip is mounted, are formed on the protruding region, and
wherein the etching step is performed after the IC chip is mounted on the IC mounting terminals.

* * * * *